US012683677B2

(12) United States Patent
Wang et al.

(10) Patent No.: US 12,683,677 B2
(45) Date of Patent: Jul. 14, 2026

(54) ASSISTED BEAM TRACKING FOR USER EQUIPMENT

(71) Applicant: Google LLC, Mountain View, CA (US)

(72) Inventors: Jibing Wang, San Jose, CA (US); Erik Stauffer, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 288 days.

(21) Appl. No.: 18/705,110

(22) PCT Filed: Nov. 8, 2022

(86) PCT No.: PCT/US2022/049323
§ 371 (c)(1),
(2) Date: Apr. 26, 2024

(87) PCT Pub. No.: WO2023/081529
PCT Pub. Date: May 11, 2023

(65) Prior Publication Data
US 2025/0047372 A1 Feb. 6, 2025

Related U.S. Application Data

(60) Provisional application No. 63/276,869, filed on Nov. 8, 2021.

(51) Int. Cl.
H04B 7/19 (2006.01)
H04B 7/185 (2006.01)
(Continued)

(52) U.S. Cl.
CPC ..... H04B 7/18541 (2013.01); H04B 7/18513 (2013.01)

(58) Field of Classification Search
CPC ............ H04B 7/18541; H04B 7/18504; H04B 7/18513; H04B 7/18519
(Continued)

(56) References Cited

U.S. PATENT DOCUMENTS 5,752,187 A 5/1998 Frank et al.
10,506,483 B1 12/2019 Williamson et al.
(Continued)

FOREIGN PATENT DOCUMENTS

GB 2609612 A 2/2023
WO 2018075963 A1 4/2018
(Continued)

OTHER PUBLICATIONS

CMCC, "Other Aspects for NTN" 3GPP TSG RAN WG1 #106-4, Aug. 16-27, 2021, XP052038341, R1-2107402.
(Continued)

*Primary Examiner* — Moustapha Diaby
(74) *Attorney, Agent, or Firm* — PATENT PORTFOLIO BUILDERS PLLC

(57) ABSTRACT

A non-terrestrial, wireless communications network (NTN) can assist User Equipments (UEs) in tracking beams generated by NTN base stations for reselection purposes. The NTN determines one or more candidate beams to which the UE can reselect (e.g., while the UE is in an inactive or idle state with respect to controlling radio resources) based on a geographical location of the UE and respective existing and/or predicted non-terrestrial locations of one or more non-terrestrial base stations of the NTN. The NTN transmits an indication of the one or more candidate beams to the UE (and optionally other beam-related information, such as radio access resources and relative priorities), and the UE can reselect a subsequent beam based on the indication received from the NTN. The UE can locally store a mapping of candidate reselection beams to geographical locations for ease and efficiency of future reselections.

20 Claims, 5 Drawing Sheets

(51) Int. Cl.
  *H04W 40/02*      (2009.01)
  *H04W 84/06*      (2009.01)

(58) Field of Classification Search
  USPC .......................................................... 455/428
  See application file for complete search history.

(56)                References Cited

U.S. PATENT DOCUMENTS

| | | | | |
|---|---|---|---|---|
| 11,564,144 | B2 * | 1/2023 | Määttanen | ......... H04B 7/18541 |
| 11,736,997 | B2 * | 8/2023 | Yang | ..................... H04W 76/15 |
| | | | | 370/331 |
| 2013/0286934 | A1 | 10/2013 | Monte et al. | |
| 2016/0323032 | A1 * | 11/2016 | Ulupinar | .............. H04B 7/2041 |
| 2019/0245614 | A1 | 8/2019 | Lucky et al. | |
| 2020/0052782 | A1 * | 2/2020 | Wang | ................. H04B 7/18541 |

FOREIGN PATENT DOCUMENTS

| | | | |
|---|---|---|---|
| WO | 2020244563 | A1 | 12/2020 |
| WO | 2021088598 | A1 | 5/2021 |
| WO | 2021164883 | A1 | 8/2021 |
| WO | 2022082771 | A1 | 4/2022 |
| WO | 2022233215 | A1 | 11/2022 |

OTHER PUBLICATIONS

Moderator (OPPO), "Summary #1 of 8.4.4 Other Aspects of NR-NTN" 3GPP TSG RAN WG1 Meeting #105e, May 10-27, 2021, R1-2104776.
PCT International Preliminary Report on Patentability PCT/IPEA/416, PCT/IPEA/409 Dated Feb. 20, 2024.
PCT International Search Report and Written Opinion PCT/ISA/220, PCT/ISA/210, PCT/ISA/237 Dated Jun. 12, 2023.
PCT Invitation to Pay Fees (PCT/ISA/206) Dated Mar. 3, 2023.
PCT Written Opinion of the International Preliminary Examining Authority (PCT/IPEA/408) Dated Oct. 31, 2023.

* cited by examiner

ASSISTED BEAM TRACKING FOR USER EQUIPMENT

CROSS-REFERENCE TO RELATED APPLICATION

This application is a U.S. National Stage of International Application No. PCT/US2022/049323, filed on Nov. 8, 2022 which claims benefits and priority to U.S. Provisional Patent Application No. 63/276,869 filed Nov. 8, 2021, the entirety of which is hereby incorporated by reference.

FIELD OF THE DISCLOSURE

This disclosure relates to wireless communications and, more particularly, to a non-terrestrial network (NTN) communication system assisting a User Equipment (UE) in tracking beams generated by the NTN.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

In non-terrestrial network (NTN) communication systems, such as those which use satellite and/or High Altitude Platform (HAPs) base stations, a User Equipment (UE) tracks beams generated by the non-terrestrial base stations. Because non-terrestrial base stations are mobile, the sizes and shapes of geographical areas covered by beams generated by non-terrestrial base stations dynamically change over time. Further, as some non-terrestrial base stations can move very quickly (e.g., Low Earth Orbit (LEO) satellites) and as UEs are also mobile, UE tracking of beams generated by the non-terrestrial base stations can be challenging. Frequent beam failure may occur when the UE is not able to track and re-select to an appropriate beam quickly enough, for example, when the UE is in an inactive or idle state, or camps onto a cell of a non-terrestrial base station.

SUMMARY

The methods and techniques disclosed in this document assist UEs in tracking beams generated by non-terrestrial base stations of a non-terrestrial, wireless communications network (NTN) or system. The NTN determines one or more candidate beams to which the UE can reselect (for example, while the UE is in an inactive or idle state with respect to controlling radio resources) based on a geographical location of the UE and respective non-terrestrial locations of one or more non-terrestrial base stations of the NTN. The NTN transmits an indication of the one or more candidate beams to the UE, and the UE can reselect a subsequent beam based on the indication received from the NTN. As such, the NTN assists the UE in tracking beams, e.g., for re-selection purposes.

The NTN can indicate the candidate beams to the UE, for example, by providing indications of respective beam identifiers such as Beam-Radio Network Temporary Identifiers (B-RNTIs), by providing indications of respective beam-specific Random Access Channel (RACH) resources or other beam-specific resources, and/or by providing any other suitable indications. Each beam generated by the non-terrestrial base stations of the NTN corresponds to a respective area in which UEs may be geographically located. That is, each beam provides communications coverage to a respective geographical area on the ground, e.g., a respective "footprint" of coverage by the beam. As such, UEs can be grouped on a per-beam or per-geographical area basis, and the NTN can transmit the indication of the one or more candidate beams to a group of UEs located within a geographical area, e.g., either as a group and/or via individual messages. In some embodiments, the NTN indicates the candidate beams to a UE by providing an indication of respective group identifiers corresponding to the candidate beams.

In some situations, the NTN transmits or communicates an indication of one or more candidate beams to the UE in conjunction with an instruction to the UE to release an existing connection, via a System Information Block (SIB), and/or via a Periodic Downlink Control Channel (PDCCH), for example. The NTN may indicate a single (e.g., only one) candidate beam, or the NTN may indicate multiple candidate beams. In some embodiments, the NTN transmits an indication of a mapping of different candidate beams to different geographical areas, and a UE can reselect a subsequent beam to utilize based on the mapping. For example, the UE can reselect from among the different candidate beams indicated by the mapping based on a current and/or predicted geographical location of the UE and/or based on measurements of the different candidate beams obtained at the UE. In these embodiments, when the UE moves to a different location, the UE can autonomously reselect a further subsequent beam based on the received (and locally stored) mapping.

In some embodiments, the NTN transmits or communicates other information to assist the UE in tracking beams and transferring to subsequent beams. For example, the NTN can transmit information indicative of one or more trigger conditions (e.g., levels, magnitudes, and/or values of Reference Signal Received Power (RSRP) thresholds, of Signal to Interference and Noise Ratio (SINR) thresholds, of RSRP and/or SINR magnitudes of hysteresis, various offsets, etc.) whose respective occurrence can cause the UE to initiate reselection. Different trigger conditions and/or different levels, magnitudes, or values of trigger conditions can correspond to different geographical areas. The NTN can adjust the respective levels, magnitudes, or values of the one or more trigger conditions to cause a UE to move to a reselected beam earlier or later, for example.

In some scenarios, the NTN transmits or communicates an indication of respective sets of RACH resources for the UE to utilize in connecting to the one or more candidate beams. Additionally or alternatively, the NTN transmits or communicates an indication of respective beam priorities of the one or more candidate beams. The beam priorities can correspond to respective geographical areas and/or to other criteria, for example. The UE can utilize some or all of this information, and optionally may utilize other information (such as locally stored satellite maps) to reselect a subsequent beam.

In an embodiment, a method in a user equipment device (UE) includes receiving, by processing hardware of the UE, and via a first beam generated by a first non-terrestrial base station of a non-terrestrial network (NTN), an indication of a set of candidate beams for the UE to use to communicate with the NTN. The method further includes, while the UE is not in a connected state of a protocol for controlling radio resources, reselecting, by the processing hardware of the UE, a second beam from the set based on the received indication. The first non-terrestrial base station or a second non-terrestrial base station of the NTN generates the second beam.

In an embodiment, a method in a non-terrestrial network (NTN) includes determining, by processing hardware of the NTN, a candidate beam for a set of User Equipment devices (UEs) to use to communicate with the NTN. The candidate beam is generated by a non-terrestrial base station of the NTN, and the determining is based on a non-terrestrial location of the non-terrestrial base station and a geographical area corresponding to respective geographic locations of the set of UEs. The method further includes transmitting, by processing hardware of the NTN, an indication of the candidate beam to the set of UEs.

DETAILED DESCRIPTION

Figure 1:
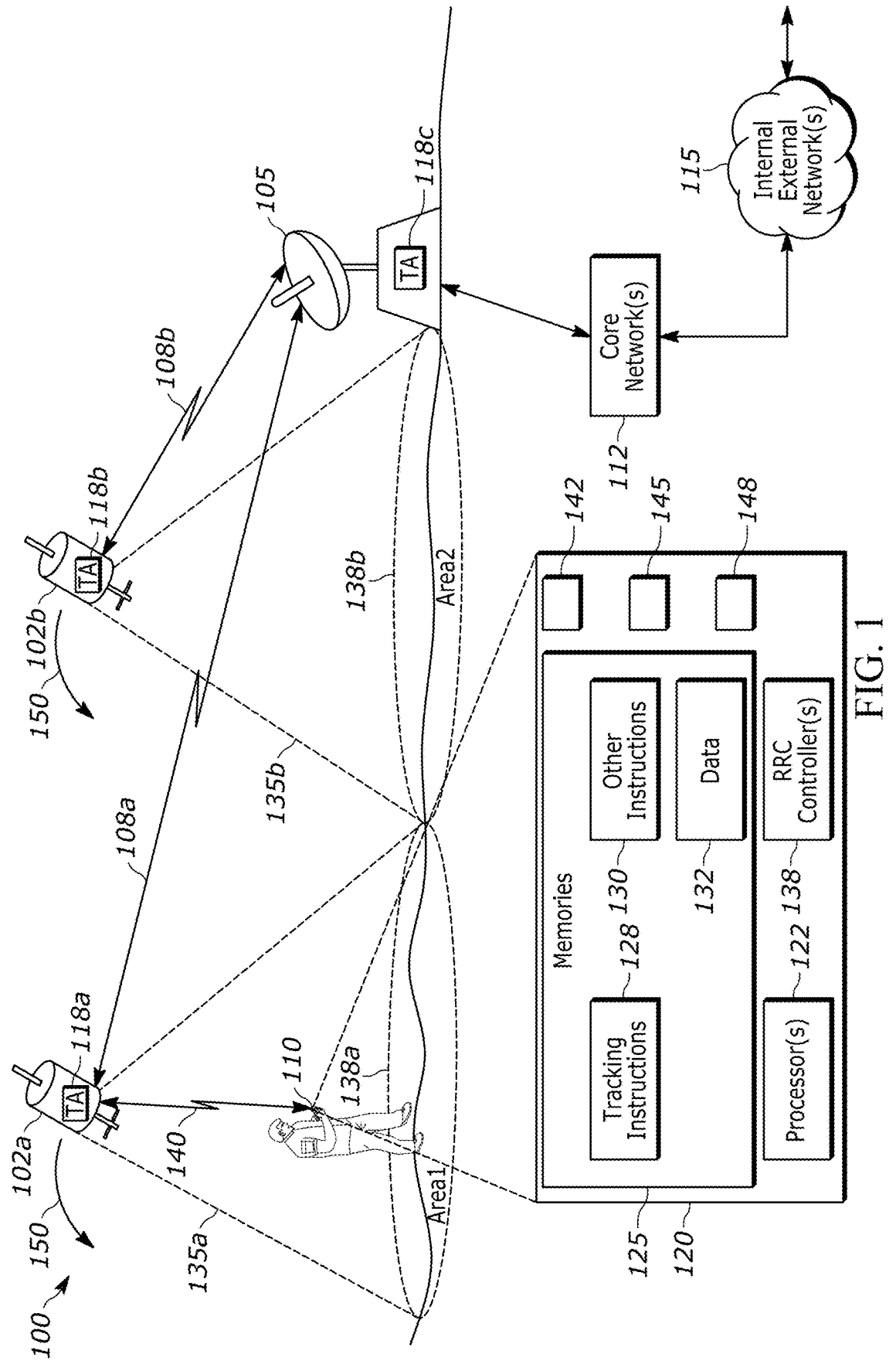
FIG. 1 depicts an example non-terrestrial network (NTN) wireless communications system in which devices such as base stations and User Equipments (UEs) communicate data, and that supports assisted beam tracking for UEs in accordance with at least some of the principles and techniques disclosed in this document.

FIG. 1 depicts an example non-terrestrial network (NTN) wireless communications system 100 in which devices such as base stations and User Equipments (UEs) communicate data, and that supports assisted beam tracking for UEs in accordance with at least some of the principles and techniques disclosed in this document. As illustrated in FIG. 1, the system 100 includes a plurality of non-terrestrial base stations ("NTN base stations") 102, which may be, for example, High Altitude Platform (HAP) base stations, satellite base stations, and/or any type of base stations which are airborne or space borne. Typically, the NTN base stations 102 are mobile and dynamically move with respect to a given position on the Earth. For example, certain types of HAP base stations (such as airplanes, airships, and drones) follow a flight pattern, certain types of HAP base stations (such as balloons and drones) are subject to winds and other environmental conditions, and satellite base stations typically orbit the earth. Although FIG. 1 depicts only two NTN base stations 102a, 102b, the NTN wireless communications system 100 is not limited to only two NTN base stations, and may include one or more other NTN base stations. Further, for ease of discussion, and not for limitation purposes, this document interchangeably refers to NTN base stations as satellite base stations, although the techniques described within this document can be easily applied to NTN systems which include other types of NTN base stations.

The satellite base stations 102a, 102b of the NTN system 100 may be geostationary, medium Earth orbit (MEO), low Earth orbit (LEO), or other types of satellites which are communicatively connected to one or more Earth or ground stations 105 of the NTN system 100, e.g., via respective links 108a, 108b. Although FIG. 1 depicts only a single Earth station 105, the NTN wireless communications system 100 can include multiple Earth stations 105.

In some embodiments, the satellite base stations 102a, 102b support wireless technologies which are utilized in terrestrial communication networks, such as 5G wireless technology. As such, in these embodiments, the satellite base stations 102a, 102b support one or more Radio Access Technologies (RATs) of the terrestrial wireless communications technology. For example, the satellite base stations 102a, 102b can operate as 5G base stations (gNBs) of the NTN system 100 which communicate with User Equipments (UEs) 110 using a New Radio (NR) RAT. Via the satellite base stations 102a, 102b and the Earth station 105, the UE 110 can communicatively connect to one or more respective core networks (CNs) 112, each of which in turn communicatively connects to the Internet and/or to any number of other private or public networks 115. In this example, the Earth station 105 serves as a communication pipe, link, or data delivery mechanism between the satellites 102a, 102b and the CNs 112. Additionally, in these embodiments, each of the satellite base stations 102a, 102b stores (e.g., on respective memories, not shown) a set of computer-executable instructions 118a, 118b which, when executed by respective one or more processors of the base stations 102a, 102b (not shown), can assist UEs 110 in tracking beams generated by the base stations 102a, 102b of the NTN 100. Accordingly, in FIG. 1 and throughout, the set of computer-executable instructions 118a, 118b are interchangeably referred herein as "Tracking Assistants" or "TAs."

In another example, the Earth station 105 can operate as a base station of the terrestrial wireless communications technology (e.g., a gNB) which communicates with UEs 110 and which communicatively connects to the CNs 112 and networks 115. As such, in this example, the Earth station 105 stores (e.g., on respective memories, not shown) computer-executable instructions 118c or an instance of the Tracking Assistant 118c which, when executed by one or more processors of the Earth station 105 (not shown), can assist UEs 110 in tracking beams generated by the base stations 102a, 102b. In this example, the satellites 102a, 102b serve as communication pipes ("bent pipes"), links, or data delivery mechanisms between the UEs 110 and the gNB or base station provided at the Earth station 105. In yet another example (not shown), the Earth station 105 can operate in conjunction with each satellite 102a, 102b to provide respective base station functionality and services; that is, a portion of base station functionality and operations can be implemented at an airborne or space borne station 102a, 102b, and a remaining portion of base station functionality and operations can be implemented at Earth station 105 in a, for example, Distributed Unit and Central Unit architecture.

For ease of discussion and not for limitation purposes, though, this document describes the satellites 102a, 102b as being base stations of the NTN communication network 100, although the techniques described within this document can easily be applied to implementations of the system 100 in which one or more Earth stations 105 serve as base stations, and/or in which one or more Earth stations 105 and one or more airborne or space borne stations 102a, 102b cooperatively serve as base stations. Generally speaking, each airborne or space borne station 102a, 102b generates one or more respective beams 135a, 135b which the stations 102a, 102b radiate towards the Earth, thereby providing respective terrestrial, geographical coverage areas 138a, 138b. As such, a UE 110 which is located within the coverage area of a beam is able to be serviced by the beam so that the UE 110 can communicate with other devices via the NTN system 100. For example, as shown in FIG. 1, the UE 110 is located within the coverage area 138a of the beam 135a generated by the satellite base station 102a, and can communicatively connect with other devices via a link 140 or other communication channel supported by the beam 135a, the link 108a, the core network 112, and the Internet networks 115.

The User Equipment (UE) 110 can be any suitable device capable of wireless communications via at least some of the one or more RATs supported by the NTN. For example, the UE 110 can communicate with the NTN system 100 via the link 140 by using a selected RAT. The UE 110 includes processing hardware 120 that can include one or more processors 122 (e.g., central processing units (CPUs), digital signal processors (DSPs), guardian service processors (GSPs), etc.) and one or more non-transitory, tangible, computer-readable memories 125 storing instructions 128, 130 that the one or more processors 122 can read and/or execute. Particularly, the memories 125 of the UE 110 store tracking instructions 128 for assisting the UE 110 in tracking beams generated by the base stations 102a, 102b of the NTN 100 in accordance with one or more of the methods, principles, and techniques disclosed in this document. In an example implementation of the UE 110, the computer-executable instructions 128, 130 are executable by the one or more processors 122 to perform any one or more of the portions of the described methods and/or techniques.

Additionally, the memories 125 of the UE 110 can store data 132 which can be utilized to perform any one or more of the portions of the described methods and/or techniques. In some implementations, the one or more processors 122 execute the computer-executable instructions 128, 130 to operate in conjunction with firmware and/or other portions of the processing hardware 120 of the UE 110 to perform any one or more of the portions of the described methods and/or techniques.

The example processing hardware 120 includes components that the UE 110 can utilize to wirelessly transfer data to and from base stations (e.g., base stations 102a, 102b) over respective radio interfaces or links (e.g., the link 140) by using various communication schemes. A "communication scheme," as utilized herein, generally refers to processing which is performed on data that is to be transferred between the UE 110 and the base station 102 to, for example, attempt to optimize transmission efficiencies and maintain fidelity of the source or original data in view of dynamic conditions at the UE and of the radio interface 140. Generally speaking, the UE and the base station determine and arrive at a communication scheme and associated parameters for transferring data therebetween. The communication scheme which is utilized by the base station and the UE can include a baseband communication scheme and a radio interface communication scheme. The baseband communication scheme may include baseband signal processing (e.g., processing related to the original data signal, whether analog or digital) activities or and/functions such as source coding, source decoding, data compression, data decompression, and/or other types of processing on baseband signals. The radio interface communication scheme can include radio interface signal processing (e.g., processing related to the wireless radio frequency (RF) signal via which the data is transmitted via carriers of the radio interface) activities and/or functions such as, for example, modulation, demodulation, channel coding, channel decoding, and/or other types of radio signal processing corresponding to transmitting and receiving wireless signals over carriers of the radio interface. For example, the one or more processors 122 (e.g., CPUs, DSPs, etc.) of the UE 110 can perform one or more baseband signal processing activities or functions, and one or more Radio Resource Control (RRC) controllers 142, modem(s) 145, and radio(s) 148 of the UE 110 can perform radio interface signal processing activities and/or functions.

Additionally, and generally speaking, the Earth or ground stations 105 and the core networks 112 are typically terrestrially located, e.g., on the ground. Accordingly, this document generally and interchangeably refers to the Earth or ground stations 105 and the core networks 112 as "terrestrial," "ground," or "back-end" components of the NTN 100.

Figure 2:
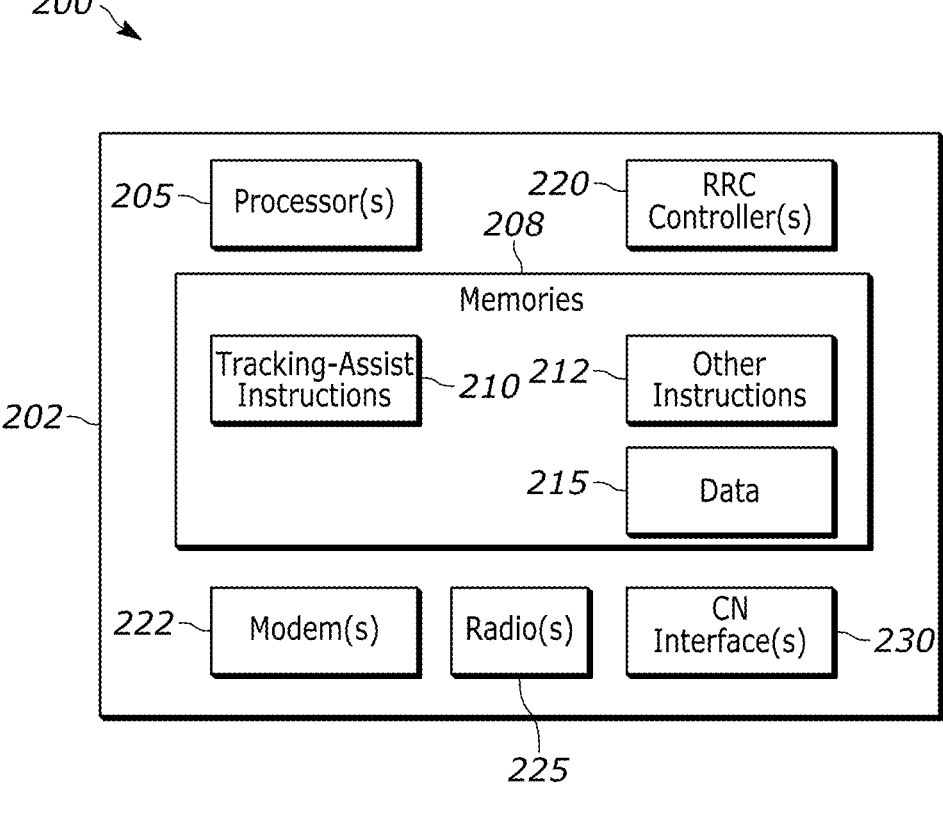
FIG. 2 is an expanded block diagram of an example base station which may be included in the NTN system of FIG. 1.

FIG. 2 depicts a more detailed block diagram of an example NTN base station 200 which may be included in the example NTN wireless communications system 100 of FIG. 1. For example, the example NTN base station 200 can be implemented as a satellite base station 102a, 102b, the NTN base station 200 can be implemented as an Earth station base station 105, or the NTN base station 200 can be implemented cooperatively between a satellite base station 102a, 102b and an Earth base station 105. At any rate, as shown in FIG. 2, the NTN base station 200 includes example processing hardware 202 that includes one or more processors 205 and one or more tangible, non-transitory computer-readable memories 208 storing computer-executable instructions 210, 212. Particularly, the instructions 210 include instructions for assisting UEs (e.g., the UE 110 and/or other UEs) with tracking beams generated by base stations of the NTN system 100 in accordance with one or more of the methods, principles, and techniques disclosed in this document. For example, instances of the instructions 210 can be the respective instances of the Tracking Assistant 118a, 118b, 118c. Additionally, the memories 208 of the base station 200 store additional, other instructions 212 which can be executed by the one or more processors 205, e.g., in conjunction with the execution of the instructions 210, to perform at least portions of the methods, principles, and techniques disclosed in this document. For the purposes of illustration and not for limitation purposes, this document discusses FIG. 2 with simultaneous reference to the NTN communication system 100 and the UE 110 of FIG. 1. However, the base station 200 may be utilized in systems other than the NTN system 100, and/or in conjunction with UEs other than the UE 110.

In an implementation, the computer-executable instructions 210, 212 are executable by the one or more processors 205 to perform any one or more of the portions of the described methods and/or techniques. Additionally, the memories 208 can store data 215 utilized to perform any one or more of the portions of the described methods and/or techniques. In some implementations, the one or more processors 205 execute the computer-executable instructions 210 to operate in conjunction with firmware and/or other portions of the processing hardware 202 to perform any one or more of the portions of the described methods and/or techniques.

The example processing hardware 202 of the NTN base station 200 includes components that the base station 200 utilizes to wirelessly transfer data to and from the UE 110, e.g., via the link 140 supported by the beam 135a. As previously discussed, the UE 110 and the base station determine and arrive at a communication scheme and associated parameters for transferring data therebetween. The communication scheme can include baseband signal processing (e.g., processing related to the original data signal, whether analog or digital) and radio interface signal processing (e.g., processing related to the wireless radio frequency (RF) signal via which the data is transmitted via carriers of the radio interface). For example, the one or more processors 205 (e.g., CPUs, DSPs, GSPs, etc.) of the base station 200 can perform baseband signal processing activities or functions such as source coding, source decoding, data compression, data decompression, and/or other types of processing on baseband signals. Additionally, one or more Radio Resource Control (RRC) controllers 220, modem(s) 222, and radio(s) 225 of the base station 200 can perform radio interface signal processing activities and/or functions such as, for example, modulation, demodulation, channel coding, channel decoding, and/or other types of radio signal processing corresponding to transmitting and receiving wireless signals over carriers of the radio interface.

The example processing hardware 202 of the NTN base station 200 also includes one or more core network interfaces 230 that the base station 200 uses to connect with and communicate digital signals to/from a respective core network (e.g., CN 112). In some embodiments, each particular CN interface 230 connects with only a single, different type of CN, and in some embodiments, a single one of the one or more core network interfaces 230 connects with multiple types of CNs.

Figure 3:
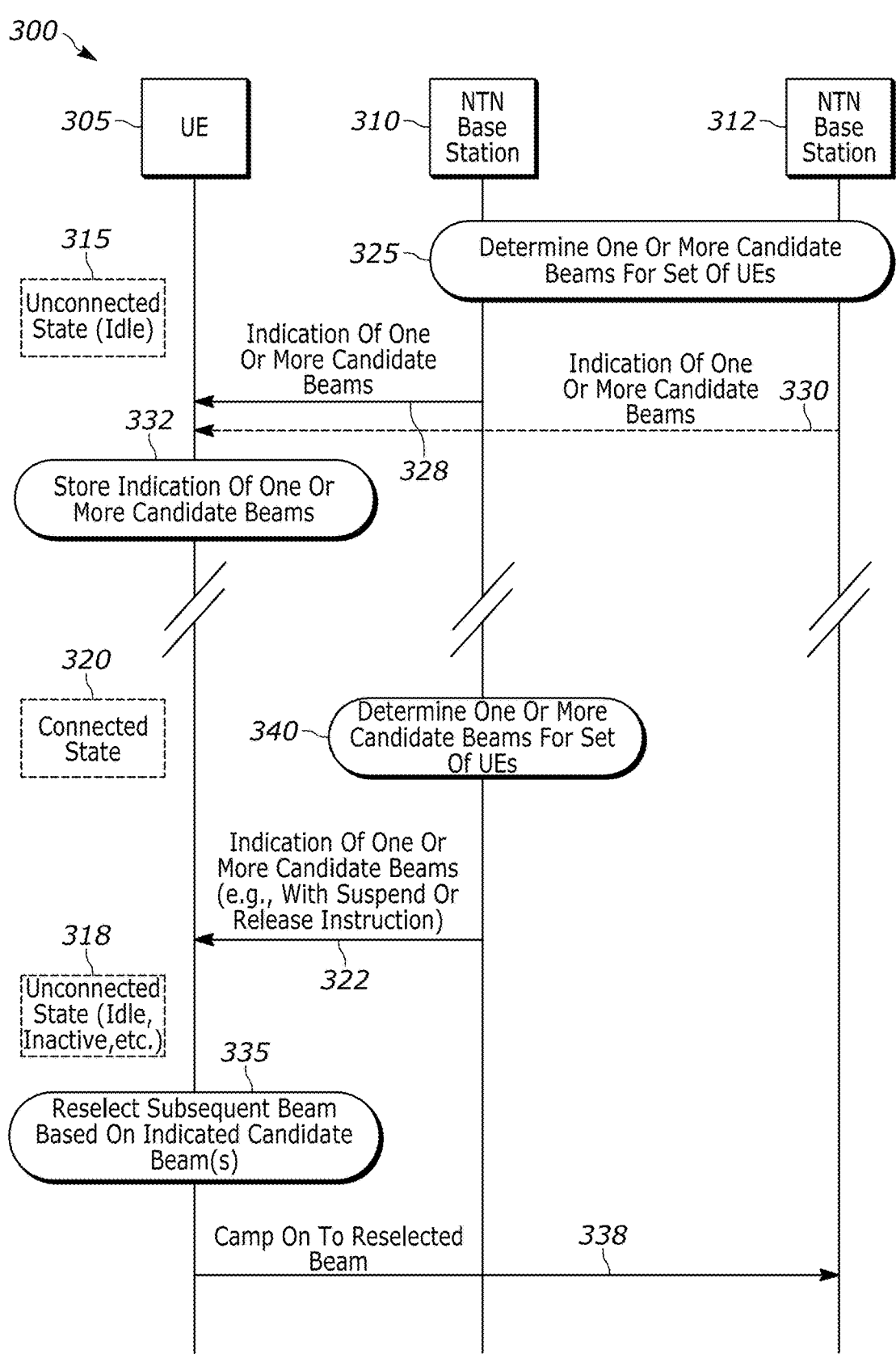
FIG. 3 is a message flow diagram illustrating tracking assistance techniques in accordance with at least some of the principles and techniques disclosed in this document.

FIG. 3 depicts an example message flow diagram 300 illustrating at least some of the tracking assistance techniques in accordance with at least some of the principles and techniques disclosed in this document. The example message flow diagram 300 depicts messaging which can occur between a UE 305, a first NTN base station 310, and a second NTN base station 312. For example, the UE 305 can be the UE 110 of FIG. 1, the NTN base stations 310, 312 can be the satellite base stations 102a, 102b of FIG. 1, the NTN base stations 310, 312 can be NTN base stations implemented at respective Earth stations 105, and/or the NTN base stations 310, 312 can be instances of the NTN base station 200 of FIG. 2. The description of the message flow diagram 300 below simultaneously references FIGS. 1-2 for clarity of illustration (and not limitation) purposes. Also, for the sake of clarity, additional, known signaling is omitted.

In the example message flow 300, at various times the UE 305 can be operating in an Unconnected state (e.g., the UE 305 is not in a Connected state) of a protocol for controlling radio resources, as denoted by references 315, 318. Examples of Unconnected states include the Idle state, the Inactive state, and other radio interface connection states in which the UE 305 is not connected via a radio interface to any base station of the NTN communications system 100. In an embodiment, the protocol for controlling radio resources is a Radio Resource Control (RRC) protocol, such as a layer 3 or Network Layer protocol used on air interfaces such as UMTS (Universal Mobile Telecommunications System), LTE (Long Term Evolution), 5G (5$^{th}$ generation mobile network), 6G (6$^{th}$ generation mobile network), etc. In other embodiments, the protocol for controlling radio resources is another suitable protocol which is used over the air interface between the UE 305 and base stations of the NTN system 100. For ease of discussion, though, and not for limitation purposes, the protocol for controlling radio resources is referred to within this document as the "RRC protocol." In the description of FIG. 3 below, this document first introduces example scenarios in which assisted beam tracking can be utilized, and then describes possible assisted beam tracking techniques for the example scenarios.

In a first example scenario depicted in the message flow 300, the UE 305 enters into operating in an Idle state 315 with respect to the RRC protocol upon initialization, powering up, re-booting, or initially moving into a coverage area of the NTN wireless system 100 (e.g., from the coverage area of another wireless communications system). As such, for ease of reference, the Idle state 315 is referred to herein as a "post-initialization" Idle state 315 (although the Idle state 315 may equally apply to other scenarios other than initialization, such as re-boot, power up, initially moving into the coverage areas of the system 100, etc.). In the Idle state 315, the UE 305 is located in a terrestrial, geographical area which is covered by a beam generated by the NTN base station 310, and the UE 305 detects a beam generated by the NTN base station 310. The detected beam can transport a paging or downlink control channel, a beacon, etc. However, as the UE is in the Idle state 315, the UE 305 does not have an established radio interface connection with the NTN base station 310 or with any other NTN base station of the NTN system 100. Generally speaking, though, while the UE 305 is operating in the Idle state 315 of the RRC protocol, the UE 305 can receive broadcast data via the beam generated by the NTN base station 310, the UE 305 can monitor a paging or downlink control channel (e.g., Physical Downlink Control Channel or PDCCH) of the beam generated by the NTN base station 310, the UE 305 can perform measurements of the beam(s) generated by the NTN base station 310, the UE 305 can perform measurements of beams generated by proximately-located NTN base stations, etc.

In a second example scenario depicted in the message flow 300, at some time after initialization or after moving into the coverage area of the NTN system 100 and operating in the post-initialization Idle state 315, the UE 305 and the NTN base station 310 establish a radio interface connection, thereby causing the UE 305 to transition into operating in a Connected state 320 with respect to the RRC protocol. While operating in the Connected state 320, the UE 305 can transmit data to and receive data from the NTN base station 310 via the established radio interface connection. At some time thereafter, the NTN base station 310 sends a Release instruction 322 to the UE 305, thereby releasing or terminating the radio interface connection and causing the UE 305 to enter into operating in an Idle state 318. As such, for ease of reference, the Idle state 318 is referred to herein as a "post-connected" Idle state 318. Similar to the post-initialization Idle state 315, while the UE 305 is operating in the post-connected Idle state 318, the UE 305 can receive broadcast data via the beam generated by the NTN base station 310, the UE 305 can monitor a paging or downlink control channel of the beam(s) generated by the NTN base station 310, the UE 305 can perform measurements of beams generated by proximately-located NTN base stations, etc.

A third example scenario depicted in the message flow 300 is similar to the second example scenario except that the NTN base station 310 sends a Suspend instruction or a Release with Suspend instruction 322 to the UE 305, thereby terminating the radio interface connection between the NTN base station 310 and the UE 305, and causing the UE 305 to transition from operating in a Connected state 320 of the RRC protocol to operating in the Inactive state 318 of the RRC protocol. In this example, because the UE 305 is operating in the Inactive state 318, the UE 305 maintains registration and context information corresponding to the immediately previous radio interface connection with the NTN 100 (e.g., corresponding to the connection associated with the Connected state 320). Similar to the post-initialization Idle state 315, though, while the UE 305 is operating in the Inactive state 318, the UE 305 can receive broadcast data via the beam generated by the NTN base station 310, the UE 305 can monitor a paging or downlink channel of the beam generated by the NTN base station 310, the UE 305 can perform measurements of beams generated by proximately-located NTN base stations, etc.

As discussed above, in the message flow 300, the UE 305 is located in a terrestrial geographical area covered by a beam generated by the NTN base station 310; that is, the UE 305 is located within a footprint of the beam generated by the NTN base station 310. However, because NTN base stations of the NTN system 100 are mobile, the size and the shape of the terrestrial geographical area covered by the beam generated by the NTN base station 310 (and of other beams generated by other NTN base stations, for that matter) dynamically change over time. For example, referring to FIG. 1, the UE 110 is shown as being located in geographical area 138a covered by the beam 135a generated by the satellite base station 102a, and the satellite base station 102a is moving in the direction 150. As such, the coverage area 138a generated by the base station 102 moves in concert with the movement of the base station 102a so that at some point in time, the detection of the beam 135a by the UE 110 begins to wane, and consequently, at the UE 110, the signal strength and/or the quality of service of the beam 135a begins to decrease. In these situations, the UE 110 can perform a reselection procedure to reselect another beam generated by the NTN system 100, where the reselected beam provides more optimum radio conditions among a candidate set of beams generated by the NTN base stations of the NTN system 100. The reselected beam can be another beam generated by the satellite base station 102a (e.g., where the reselected beam is steered in a direction different than the direction of the beam 135a), or the reselected beam can be generated by a different satellite base station, such as by the satellite base station 102b. At any rate, when the UE 110 is operating in the Idle, Inactive, or other Unconnected state, the UE 110 can camp on (e.g., register) to the reselected beam to thereby maintain contact with the NTN communication system 100.

Known techniques for beam reselection typically require the UE 305 to obtain and evaluate various measurements of the beam presently serving the UE 305 (e.g., the beam 135a in FIG. 1, or the beam generated by NTN base station 310) and non-serving beams to determine a suitable reselected beam. As such, with known reselection techniques, the UE 305 operates in a vacuum with respect to overall system resources, because the UE 305 reselects based on only the beam measurements that the UE 305 itself detects, calculates, and determines. Further, because the satellite base station 310 moves much more quickly than the UE 305, the UE 305 can expend significant resources to track, measure, and reselect beams generated by various NTN base stations because the beams' respective fidelities, from the perspective of or as measured by the UE 305, can change quickly over time. Indeed, frequent beam failure may occur when the UE is not able to track and reselect to an appropriate beam quickly enough, thus requiring even more UE and air interface resources.

Advantageously, with the techniques described within this document, the NTN system 100 assists the UE 305 in tracking candidate beams for reselection, thereby decreasing system resource usage and UE resource usage, as well as maintaining the fidelity of the monitoring of and interactions between the UE 305 and the system 100. Generally, with assisted beam tracking, the UE 305 does not rely solely on the beam measurements that the UE 305 has made to reselect a subsequent beam. Rather, the UE 305 reselects a subsequent beam based on both beam measurements made at the UE 305 and candidate beam information transmitted by the NTN communication system 100, e.g., via one or more NTN base stations. In this manner, the UE 305 can reselect a beam not only based on the radio conditions determined by the UE 305, but also based on system conditions as determined by the NTN communication system 100. Further, in some embodiments, assisted tracking information provided by the system 100 to the UE 305 can be stored at the UE 305 for subsequent reselection procedures, thus further decreasing the amount of messaging and air interface resource usage between the UE 305 and the system 100. The system 100 can assist UEs by broadcasting candidate beam information (e.g., point-to-multipoint candidate beam information distribution), and/or the system 100 can assist a specific UE by sending respective reselection beam information directly to the specific UE (e.g., point-to-point candidate beam information distribution).

To illustrate, in the first example scenario depicted in FIG. 3, to assist the UE 305 in beam tracking, the NTN system 100 (e.g., at the NTN base station 310, the NTN base station 312, and/or other NTN base stations) can determine 325 one or more candidate beams for reselection, and the NTN system 100 can cause an indication of the one or more candidate beams to be broadcasted, e.g., via the NTN base station 310 associated with the UE 305 (as denoted by reference 328) and optionally via one or more other NTN base stations 312 (as denoted by reference 330). Determining 325 the one or more candidate beams can be based on, for example, current, expected, predicted, and/or planned respective spatial (e.g., non-terrestrial) positions of NTN base stations of the system 100; current, expected, and/or predicted interference; current, expected, predicted, and/or planned maintenance of the system NTN base stations (during which components may be temporarily out of service); current, expected, predicted, and/or planned capacities and/or loading of beams generated by the system NTN base stations; current, expected, predicted, and/or planned footprints (e.g., terrestrial, geographical coverage areas) of the beams, and the like. Thus, in the first example scenario, upon the UE 305 initializing, re-booting, powering up, or initially moving into a coverage area of the NTN system 100 and being in the post-initialization Idle state 315, the UE 305 can detect the presence of one or more of the base stations 310, 312, and the UE 305 can obtain the indication of the one or more candidate beams for reselection from the information broadcasted by the base stations 310, 312.

The NTN base station 310 (and optionally one or more other NTN base stations 312) can indicate the one or more candidate beams using any suitable type of indicator. For example, the NTN base station 310 (and optionally one or more other NTN base stations 312) can indicate each candidate beam using a respective Radio Network Temporary Identifier (RNTI) of the beam, e.g., a "Beam-RNTI" or "B-RNTI." The NTN base station 310 (and optionally one or more other NTN base stations 312) can additionally or alternatively indicate each candidate beam using one or more respective Random Access Channel resources of each candidate beam, such as the corresponding time slot, frequency-resource block, sequence, etc. of the Physical Random Access Channel (PRACH), e.g., in the same or different message as the message in which the B-RNTI was indicated.

In some embodiments, an indication of a candidate beam can include an indication of the radio access resources of the candidate beam (e.g., channel, timing, etc.) that are scrambled by using the B-RNTI of the candidate beam, e.g., in a manner such as will be discussed in more detail elsewhere. Of course, other indicators of beams may be possible, such as bit maps, indexes of stored tables, or dictionaries of beams, etc. Further, in some scenarios, the NTN base station 310 (and optionally one or more other NTN base stations 312) can indicate, in conjunction with the indication of each candidate beam, a respective priority of each candidate beam with respect to the priorities of other beams which are reselection candidates. For example, the candidate beams can be indicated in a priority order, or a respective priority level can be indicated for each candidate beam.

In some situations, the NTN base station 310 transmits or broadcasts 328 (and optionally one or more other NTN base stations 312 transmit or broadcast 330) an indication of only a single or sole candidate beam to the UE 305. Additionally, the NTN base station 310 can additionally or alternatively transmit or broadcast 328 (and optionally one or more other NTN base stations 312 can additionally or alternatively transmit or broadcast 330) an indication of one or more RACH resources of the sole candidate beam, e.g., in the same or different message as the message in which the sole candidate beam was indicated. For example, when the NTN base station 310 indicates only a single candidate beam, the NTN base station 310 can transmit/broadcast 328 only RACH resource indications and/or information corresponding to the single candidate beam without transmitting a separate identifier of the beam. In some scenarios, the NTN base station 310 can transmit/broadcast 328 (and optionally one or more other NTN base stations 312 can transmit/broadcast 330) an indication of multiple candidate beams to the UE 305. In embodiments, the NTN base station 310 and/or the NTN base station 312 can transmit or broadcast indications of respective RACH resources of each candidate beam, respective priorities of each candidate beam with respect to priorities of other candidate beams, etc. Different NTN base stations 310, 312 may transmit or broadcast different candidate beam information. For example, each NTN base station 310, 312 can transmit or broadcast candidate beam information for respective, proximate candidate beams.

In some scenarios, the NTN base station 310 transmits/ broadcasts 328 (and optionally one or more other NTN base stations 312 transmit/broadcast 330) a mapping of different candidate beams to different geographical areas. That is, the NTN base station 310 can transmit or broadcast 328 (and optionally one or more other NTN base stations 312 can transmit 330) a mapping of different geographical areas which are planned or predicted to be covered by different beams generated by various NTN base stations of the system 100 at different times. The mapping can be generated based on dynamically changing positions, accessibilities, and/or availabilities of NTN base stations and/or components thereof, and the mapping can indicate the different candidate beams by respective beam identifiers, such as by B-RNTIs or other suitable identifiers. In this embodiment, the mapping can also include or indicate respective RACH resources of each beam, respective priorities of each beam with respect to priorities of other beams, etc. The UE 305 can locally store the mapping to utilize for reselecting candidate beams while the UE 305 is under the coverage of any of the NTN base stations of the NTN communication system 100.

Further, the NTN base station 310 can transmit or broadcast 328 (and optionally one or more other NTN base stations 312 can transmit or broadcast 330) the indication of the candidate beam(s) (and optionally related information such as indications of respective RACH resources, priorities, etc.) via different channels and/or messages. For example, the NTN base station 310 can transmit the indication via a Physical Downlink Control Channel (PDDCH), in downlink control information (DCI), or in other types of information which can be transmitted via the PDDCH. In another example, the NTN base station 310 (and optionally one or more other NTN base stations 312) can transmit the indication of the candidate beam(s) (and optionally of related information such as indications of respective RACH resources, priorities, etc.) via a Physical Downlink Shared Channel (PDSCH), e.g., by using a System Information Block (SIB) or other suitable message.

The UE 305 can store 332 the indication of the one or more candidate beams received via the indication 328 and/or via the indication 330, e.g., as data 132 in the one or more memories 125 of the UE 305. Further, at some time thereafter, the UE 305 can reselect 335 a subsequent beam based on the locally-stored indication of the candidate beam(s) (and optionally, other related information such as RACH resources, priorities, etc.), and can camp on 338 to the reselected beam (which, in FIG. 3, is depicted as being generated by the NTN base station 312).

In the second and third example scenarios shown in FIG. 3, the UE 305 is operating in the Connected state 320. The NTN base station 310 (with which the UE 305 has a radio interface connection) determines 340 one or more candidate beams for reselection, and transmits 322 an indication of the one or more candidate beams to the UE 305. The NTN base station 310 can determine the one or more candidate beams for reselection in a manner similar to that of the determination 325, for instance. In these scenarios, the NTN base station 310 can include the indication of the candidate beam(s) in a Suspend message, in a Release message, or in a Release with Suspend message, that is, in a point-to-point message from the NTN base station 310 to the UE 305. Alternately, the NTN base station 310 may transmit the indication of the candidate beams in a different message, albeit in conjunction with the Release or Suspend message, e.g., via the PDCCH and/or the PDSCH. The indication of the candidate beam(s) 322 can indicate only a single candidate beam or can indicate multiple candidate beams. In embodiments, the indication 322 includes a mapping of different candidate beams to different geographical areas, such as in a manner described above for the indication 328, 330. In embodiments, the indication 322 can additionally or alternatively include information related to the candidate beam(s), such as respective RACH resource information, respective priority information, etc. At any rate, the UE 305 can utilize the indication of the candidate beams 322 to reselect a subsequent beam 335 and camp on 338 to the reselected beam. In embodiments in which the UE 305 previously stored 332 an indication of candidate beams, the UE 305 can additionally update its locally-stored indication of candidate beams based on the most recently transmitted indication of candidate beams 322 (not shown in FIG. 3).

Thus, as illustrated in FIG. 3, the system 100 can assist the UE 305 with beam tracking in multiple ways at multiple times. For example, the system 100 can broadcast candidate beam information for reselection which can be stored and/or utilized by UEs which have recently initialized, re-booted, moved into the coverage area of base stations of the system 100, etc., or at any other time. In another example, when the system 100 determines a change to a previously-broadcasted mapping of one or more candidate reselection beams to respective geographical areas, the system 100 can broadcast updated candidate beam information for reselection. Additionally or alternatively, the system 100 can send a direct, individual message to a UE including candidate reselection beam information or updates thereto, for temporary use and/or for updating locally-stored mapping information.

Further, in scenarios in which the UE 305 has stored 322 an indication of the mapping of candidate beams to geographical locations (and optionally other related information, such as times during which the beams are candidates for their respective geographical locations, respective radio access resources for the candidate beams, relative priorities among the candidate beams, etc.), when the UE 305 reselects to a new beam (e.g., due to exceeding an associated threshold), the UE 305 can simply use the reselected beam identifier (e.g., a B-RNTI) to determine, from the stored mapping, the NTN-BS2 system information beam for registration on the new beam. In a similar manner, when the UE 305 reselects to a new NTN base station (e.g., due to exceeding an associated threshold), the UE 305 can use the reselected beam identifier (e.g., a B-RNTI) to pick the channel, timing, and other RACH resources from the stored mapping to quickly find the corresponding system information beam for cell registration on the new NTN base station, thus allowing the UE 305 to forgo receiving the new NTN base station's Master Information Block (e.g., which can include, for example, satellite ephemeris information such as current and/or predicted satellite locations, timing information, satellite health, and the like) and immediately proceed to receiving the new NTN base station's System Information Block (e.g., SIB1). For example, for NTN assistance, a System Information Block can include an indication of mappings between UE identifiers, beam identifiers, and/or geographical areas/locations; an indication of one or more candidate beam identifiers for cell and/or beam reselection; an indication of GPS or other location coordinates of one or more UEs to be moved to a particular candidate beam; etc.). As such, by using the techniques described in this document, beam registration on the reselected beam and/or cell registration on a reselected cell or NTN base station can be performed more quickly (as compared to known techniques), and consequently, the UE 305 can move to being serviced by a stronger beam more quickly (as compared to known techniques). As such, overall fidelity and quality of wireless communications between the system 100 and the UE 305 improves, and battery life at the UE 305 also improves, at least due to the UE 305 consuming less resources for reselection.

Figure 4:
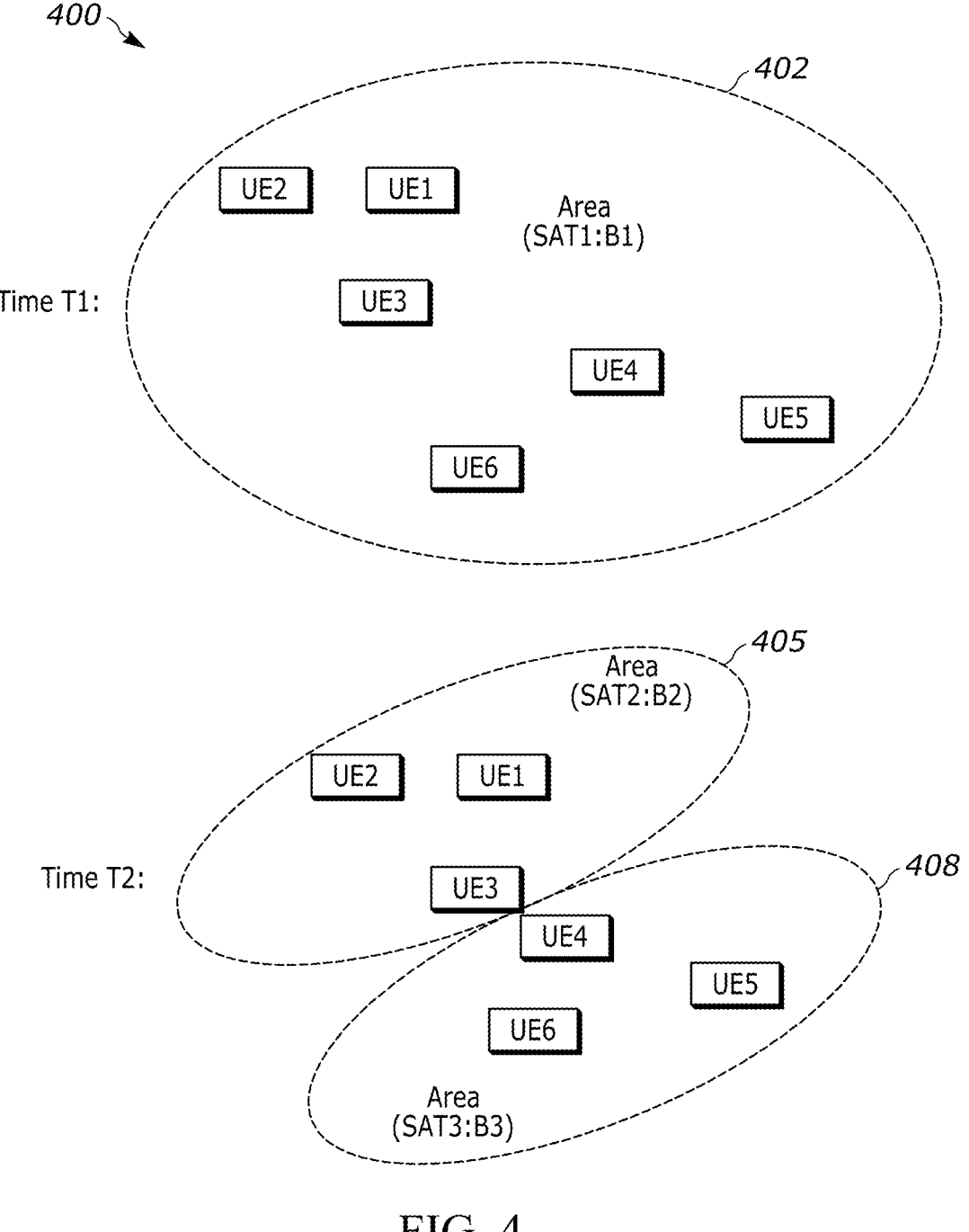
FIG. 4 is an example scenario illustrating example beam coverages before and after beam reselection with system tracking assistance in accordance with at least some of the principles and techniques disclosed in this document.

FIG. 4 is an example scenario 400 illustrating example beam coverages before and after beam reselection with system tracking assistance, in accordance with the techniques described in this document. For example, at least part of the example scenario 400 can be implemented using the system 100 of FIG. 1 and/or the NTN base station 200 of FIG. 2, for instance, via TA 118*a*, TA 118*b*, TA 118*c*, and/or core network(s) 112. Additionally or alternatively, at least a part of the example scenario 400 can be implemented at one or more UEs by executing respective tracking instructions 128, for example. For clarity of illustration, but not for limitation purposes, this document discusses FIG. 4 with simultaneous reference to FIGS. 1, 2, and 3.

In the scenario 400, at a time T1, a set or group of UEs, e.g., UE1-UE6, obtains communications coverage via a beam B1 that is generated or radiated by a satellite base station SAT1 of an NTN wireless communications system, such as the system 100 of FIG. 1. (For ease of discussion, this document utilizes the syntax "SAT1:B1" to refer to beam B1 generated by base station SAT1.) That is, each of UE1-UE6 is respectively located in a terrestrial geographical location 402 which is covered by SAT1:B1, e.g., a "footprint" 402 of SAT1:B1. Each of UE1-UE6 can be a respective instance of the UE 110 or the UE 305, and the satellite base station SAT1 can be an instance of the NTN base station 102*a*, 200, or 310, for example. One or more of the UEs UE1-UE6 can be operating in an Unconnected state of a protocol for controlling radio resources, such as an Idle state, an Inactive state, or some other Unconnected state in which the UE has detected the beam B1 and during which the UE can receive beam B1 but the UE does not have any established radio interface connection with SAT1 or with any other NTN base station of the NTN system.

Because satellite base station SAT1 travels in an orbit and the orbit follows a prescribed path, the NTN system 100 can predict that at a subsequent time T2, beam B1 generated by SAT1 will no longer be able to provide suitable coverage for UE1-UE6, because the footprint 402 of beam B1 will have shifted to a different geographical location. Furthermore, because all satellite base stations of the system 100 travel in prescribed paths, the system 100 can predict that at time T2, the terrestrial geographical location 402 covered by beam B1 at time T1 will be instead covered by two different beams at time T2, e.g., a first portion 405 by beam B2 generated by satellite base station SAT2 (e.g., "SAT2:B2") and a second portion 408 by beam B3 generated by satellite base station SAT3 (e.g., "SAT3:B3). For example, as shown in FIG. 4, at time T2, beam SAT2:B2 will cover terrestrial geographical area 405 in which UE1-UE3 are located, and beam SAT3:B3 will cover terrestrial geographical area 408 in which UE4-UE6 are located. In this example scenario 400, because the satellites SAT1-SAT3 move at much quicker speeds than the terrestrially-located UEs UE1-UE6, and because the line-of-sight distances between each of the satellites SAT1-SAT3 and the terrestrially-located UEs is sufficiently large, UE1-UE6 appear, to the system 100, to be relatively stationary with respect to the satellites. As such, to maintain suitable or sufficient quality of coverage for the UEs UE1-UE6 in view of the fast-moving base stations SAT, SAT2, SAT3, the NTN system 100 can communicate, to each of the UEs UE1-UE6, one or more respective candidate beams for reselection based on the current geographical locations of UE1-UE6, e.g., at time T1. For instance, the NTN system 100 can transmit an indication of SAT2:B2 as a reselection candidate beam to UE1, UE2, UE3, and UE4 and the NTN system 100 can transmit an indication of SAT3:B3 as a reselection candidate beam to UE4, UE5 and UE6. Additionally or alternatively, the NTN system 100 can transmit or broadcast, to all or a subset of UEs located within the geographical area 402, an indication of a first association between SAT2:B2 and the geographical location 405, and an indication of a second association between SAT3:B3 and the geographical location 408.

In an embodiment, the NTN system 100 transmits the indication of the candidate beam(s), e.g., via broadcast, and at least some of the UEs UE1-UE6 receive the indication of the candidate beam(s) upon a respective initialization, re-booting, or powering up of each UE, and/or upon a UE initially moving into a coverage area provided by some NTN base station of the NTN system 100 (e.g., from a coverage area of a different wireless communications system). For example, at time T1, the NTN system 100 can broadcast the indication 325 of one or more candidate beams via SAT1: B1, and any UEs located in the geographical footprint 402 of SAT1:B1 can receive the transmitted indication 325. In a similar manner, at time T2 or sometime thereafter, the NTN system 100 can transmit or broadcast, via SAT2:B2, an indication 325 of a different set of candidate beams for reception by a set of UEs located in the geographical footprint 405 of Beam 2, and the NTN system 100 can transmit or broadcast, via SAT3:B3, an indication 325 of yet a different set of candidate beams for reception by a set of UEs located in the geographical footprint 408 of Beam 3. As previously discussed, the NTN 100 system can transmit the indications of different sets of candidate beams to respective UEs by broadcasting indications of associations between one or more sets of candidate beams and optionally respective (future) geographical locations for reception by any UEs which are geographically located within a footprint of a serving or non-serving beam. Additionally or alternatively, the NTN system 100 can transmit an individual message specifically to a particular UE, e.g., via a serving beam, wherein the individual message includes an indication of the set of candidate beams specific to the particular UE. Further, the NTN system 100 can transmit indications of different sets of candidate beams to respective UEs when the UEs are operating in any state of the RRC protocol.

In an example scenario in which at least some of the UEs UE1-UE6 are in a Connected state 320 of the RRC protocol, the NTN system 100 can transmit a respective indication 322 of a respective one or more candidate beams to each UE in the Connected state 320 via the NTN base station with which the UE has a radio interface connection. For example, at time T1, if UE1 is in the Connected state 320, the NTN system 100 can transmit an indication 322 of a respective set of candidate beams specifically to the UE1 via SAT1:B1, e.g., in or in conjunction with a Release or Suspend message. Similarly, at time T2, if UE4 is in the Connected state 320, the NTN system 100 can transmit an indication 322 of a respective set of candidate beams (e.g., SAT2:B2 and SAT3: B3) specifically to UE4 in conjunction with a Release or Suspend message received via SAT1:B1. In this example scenario, if a recipient UE had previously received and stored a mapping of candidate beams (such as upon the recipient UE's initialization), the recipient UE can store the indicated one or more candidate beams 322 as an update to the stored mapping. Alternatively, the recipient UE can treat the indication 322 as a temporary override to the stored mapping, after which the recipient UE can revert back to utilizing the stored mapping, e.g., in subsequent reselections.

In an example scenario in which at least some of the UEs UE1-UE6 are in an Unconnected state 315 of the RRC protocol, the NTN system 100 can transmit or broadcast, via SAT1:B1, respective indications 328 of different sets of candidate beams (and optionally corresponding geographical locations and/or other related information, such as respective RACH resources of each candidate beam, respective priorities of each candidate beam with respect to priorities of other candidate beams, etc.) to a group of UEs which are geographically located within the footprint of Beam 1. For example, the NTN system 100 can transmit the indications 328 via a PDCCH or a PDSCH corresponding to Beam 1. In this embodiment, a recipient UE can store, based on the information provided by the received indications 328, a mapping of candidate beams or update a stored mapping of candidate beams and optionally the other related information.

Figure 5:
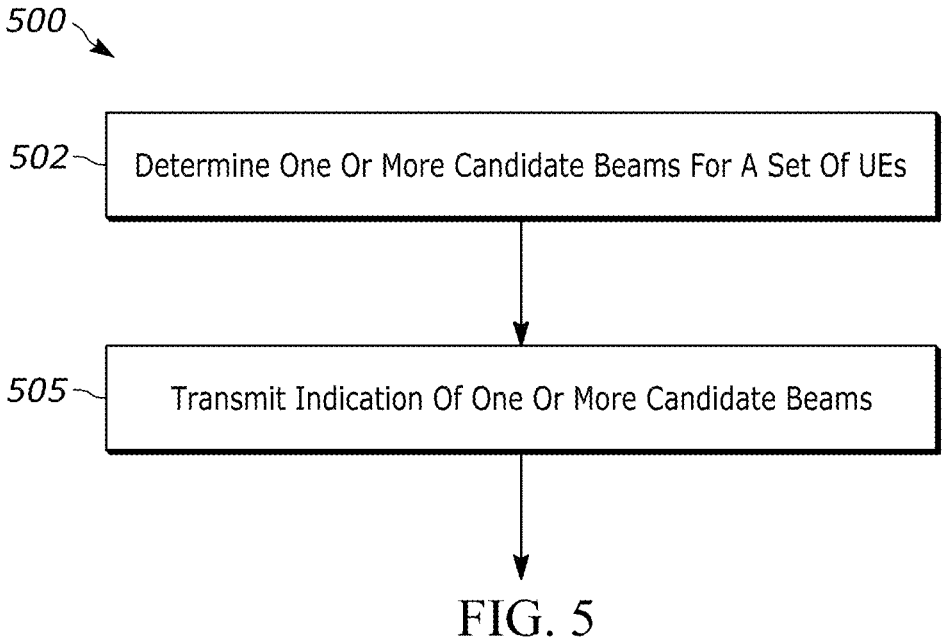
FIG. 5 depicts a flow diagram of an example method, in a non-terrestrial network (NTN) or system, of assisting User Equipments (UEs) with the tracking of beams generated by the NTN.

FIG. 5 depicts a flow diagram of an example method 500, in a non-terrestrial network (NTN) or system, for assisting User Equipments (UEs) with the tracking of beams generated by the NTN. The NTN can be or can be included in, for example, the NTN wireless communications system 100 of FIG. 1. For example, at least a portion of the method 600 can be performed by one or more NTN base stations of the NTN system, such as one or more of the NTN base stations 102a, 102b of FIG. 1, the NTN base station 200 of FIG. 2, one or more of the NTN base stations 310, 312 of FIG. 3, and/or one or more of the satellite base stations SAT1, SAT2, SAT3 discussed above with respect to FIG. 4. Additionally or alternatively, at least a portion of the method 500 may be performed by one or more components of the NTN system other than NTN base stations. The description of the method 500 below simultaneously references FIGS. 1-4 for clarity of illustration (and not limitation) purposes. Further, in some embodiments, at least portions of the method 500 may execute in conjunction with at least portions of one or more other methods described within this document, such as the method 600. Still further, in some embodiments, the method 500 includes one or more alternate and/or additional actions other than those shown in FIG. 5.

At a block 502, the method 500 includes determining, by processing hardware of the NTN, a candidate beam for a set of one or more User Equipment devices (UEs) to use to communicate with the NTN, e.g., for reselection purposes. The candidate beam is generated by an NTN base station and has a footprint that is predicted to be covering a terrestrial geographical area in which the set of UEs is located. For example, referring to FIG. 4, at time T1 the NTN determines or predicts that at later time T2, the footprint of Beam 2 generated by SAT2 will cover the terrestrial geographical area 405 in which the set of UEs UE1-UE3 is located, and the footprint of Beam 3 generated by SAT 3 will cover the terrestrial geographical area 408 in which the set of UEs UE4-UE6 is located, e.g., based on the satellites' respective flight paths or orbits. Accordingly, the processing hardware of the NTN can determine the candidate beam based on current and predicted/planned non-terrestrial locations of non-terrestrial base stations of the NTN (or the current and predicted/planned terrestrial footprints of beams generated by the non-terrestrial base stations) and optionally based on a respective, terrestrial geographical location of each UE included in the set of UEs. Accordingly, the NTN can determine different candidate beams for different subsets or subgroups of a group of UEs, even when the group of UEs is presently being covered by a single beam. For example, referring to FIG. 4, at an earlier time T1, all of the UEs UE1-UE6 are covered by the footprint 402 of SAT1:B1, and the NTN determines that, because SAT1 is moving, at later time T2, UE1-UE3 will be covered by the footprint 405 of SAT2:B2, and UE4-UE6 will be covered by the footprint 408 of SAT3:B3. That is, the NTN can predict which beams will be able to cover which UEs based on the expected spatial locations (e.g., non-terrestrial locations) of one or more NTN base stations and/or the expected footprints or terrestrial coverage areas of beams generated by the one or more NTN base stations, e.g., based on the respective orbits and/or flight paths of the one or more NTN base stations.

In embodiments, the NTN determines 502 the candidate beam for reselection further based on other criteria, such as interference and/or environmental conditions which may affect the quality of service of various beams, loading, bandwidth, and available capacity of various beams, faults, outages (planned and unplanned), and the like.

In some situations, the candidate beam is another beam (e.g., other than the presently serving beam) which is generated by the NTN base station presently servicing the set of UEs, such as when the NTN base station generates multiple beams steered in different directions. In some situations, the candidate beam is another beam generated by an NTN base station other than the NTN base station presently servicing the set of the UEs. In some situations, the NTN can determine multiple candidate beams for a set of UEs. For example, again referring to FIG. 4, the NTN can determine that both SAT2:B2 and SAT3:B3 can be candidate beams for UE3 and UE4 at time T2 because UE3 and UE4 are located on the boundary of the beams' predicted respective coverage areas 405, 408.

As previously noted, in many scenarios, terrestrially-located UEs can appear to be relatively stationary with respect to orbiting NTN base stations, e.g., because UEs typically can only move as fast as a person or an automobile or other terrestrial vehicle can move. In some scenarios, though, terrestrially-located UEs can appear to move with respect to the orbiting NTN base stations, albeit much more slowly. For example, a first UE 110 can be located on a bullet train or other type of high-speed terrestrial transport, and a second UE 110 can be located on another type of high-speed terrestrial transport. In these scenarios, the determining 502 of the respective candidate beam for each moving UE can be performed further based on the current terrestrial location of the moving UE, a predicted terrestrial location of the moving UE, a relative speed of the moving UE, and/or a direction or heading of the moving UE.

In some scenarios, the determination 502 of the candidate beam can be performed by the presently serving NTN base station. For example, in FIG. 4, SAT1 generating serving Beam 1 can determine candidate beams Beam 2 and Beam 3 for respective sets UE1-UE3 and UE4-UE6. In some scenarios, the determination 502 of the candidate beam can be additionally or alternately be performed by one or more of the base stations generating the candidate beams. For example, in FIG. 4, SAT2 generating candidate Beam 2 and/or SAT3 generating candidate Beam 3 can determine respective candidate beams for one or more of the UEs UE1-UE6, either individually, in concert with each other, and/or in concert with the serving NTN base station SAT1. Still, in some scenarios, the determining 502 of the candidate beam can be additionally or alternately be performed by one or more back-end or terrestrial components of the NTN, such as by an earth or ground station 105 and/or one or more core networks 112. For example, determining 502 of the candidate beam can be further based on current and/or predicted NTN system conditions and/or air interface conditions detected by the NTN system at various locations within the NTN, such as interference, capacities, loading, bandwidth, scheduled outages (e.g., for maintenance purposes), faults or failures, etc.

At a block 505, the method 500 includes transmitting, by the processing hardware of the NTN, an indication of the candidate beam to the set of UEs, e.g., as illustrated by references 322, 328, 330 of FIG. 3. In one example scenario, the serving NTN 310 can transmit an indication of a respective one or more candidate beams to each UE which is in a Connected state in conjunction with the transmission 322 of an instruction to release or suspend the existing connection. The indication of the respective one or more candidate beams can be included in the release or suspend instruction, or the indication of the respective one or more candidate beams can be transmitted in a separate, associated message.

In some situations, the NTN can transmit 505 indications of the respective candidate beams corresponding to various terrestrial locations via a Physical Downlink Control Channel (PDCCH), e.g., as illustrated by references 328, 330. For example, the downlink control information (DCI) provided via the PDCCH can include respective identifiers of the candidate beams corresponding to respective terrestrial locations which can be or which will be able to be serviced by the identified candidate beams. Additionally or alternatively, the NTN can transmit 505 the respective identifiers of the candidate beams via a System Information Block (SIB), which can be broadcasted using the PDDCH and the Physical Downlink Shared Channel (PDSCH). Of course, the indications of the one or more candidate beams can be transmitted 505 by the NTN via other messages and/or field of the PDDCH and/or the PDSCH.

In embodiments, the NTN transmits 505 the indication of the candidate beam in a transmission of a mapping of different candidate beams to different geographical areas or terrestrial locations where at least one geographical area corresponds to the geographical area of the set of UEs. Such embodiments can be utilized to convey expected beam-to-terrestrial location mappings at various times, for example, and recipient UEs can store the mapping for local use in beam reselection, e.g., in a manner such as this document describes elsewhere. The NTN can transmit 505 a mapping to a UE (e.g., via the PDCCH or the SIB) upon the UE initializing, booting up, and or initially moving into a coverage area of the NTN system and discovering the presence of an NTN base station of the NTN. Further, when any mapping information changes, the NTN can transmit 505 an updated mapping (or, alternatively, indications of updates to the initial mapping) to the UE or to a group of UEs (e.g., via the PDDCH or the SIB). In some embodiments, the NTN can transmit 505 a mapping by broadcasting the mapping.

The mapping can include an indication of each candidate beam corresponding to a respective geographical location, where the indication can be an explicit or direct identifier, such a beam identification, a particular set of radio access resources, etc. Additionally or alternatively, the indication can be an indirect or referential identifier of each candidate beam, such as a Beam-Radio Network Temporary Identifier (B-RNTI), a particular bit of a bit map, or other suitable indirect identifier. In an example, the NTN base station transmits a mapping of B-RNTIs to different geographical areas or locations (and optionally, indications of respective times at which the B-RNTIs are expected to provide coverage at the corresponding geographical areas or locations), and the mapping is stored by the UE for use during reselection. Subsequently, during assisted beam tracking, the NTN base station transmits, to the UE, an explicit candidate beam identification which the NTN has scrambled using the particular B-RNTI mapped to the UE's terrestrial, geographical location. That is, the NTN base station transmits the indirect or referential identification of the candidate beam (e.g., the beam's B-RNTI as utilized for scrambling) in conjunction with the explicit identification of the candidate beam (which has been scrambled using the beam's B-RNTI). The UE utilizes the stored mapping to determine the B-RNTI for its current terrestrial location, and descrambles the received transmission using the determined B-RNTI to obtain the explicit beam identification of the candidate beam. In some implementations, the NTN base station scrambles a portion or an entirety of the information transmitted by the PDDCH by using the B-RNTI corresponding to the UE's terrestrial, geographical location, where the scrambled at least a portion includes the candidate beam identification.

The mapping can additionally or alternatively include other information associated with and/or indicative of candidate beams. For example, the mapping can indicate a respective set of Random Access Channel (RACH) resources (e.g., time slot, frequency-resource block, sequence for a Physical Random Access Channel (PRACH), etc.) for the UE to utilize for each candidate beam. Indeed, in some implementations, the respective set of RACH resources itself can be an identifier of a candidate beam.

In some scenarios, the mapping can include an indication of a respective beam priority of one or more candidate beams, where the respective beam priority is relative the priorities of other candidate beams. In some implementations, the respective beam priorities can be based on terrestrial, geographical locations or areas. The UE can utilize the received priority information (and optionally the UE's terrestrial geographical location) to reselect a subsequent beam.

In some embodiments, the mapping includes an indication of a respective trigger condition for initiating reselection, which can correspond to a respective geographical location or area. For example, for a particular geographical area, the mapping can indicate that the UE is to initiate reselection when the UE detects an occurrence of the trigger condition while the UE is located in the particular geographical area. As such, trigger conditions for initiating reselection can be adjusted or tuned to expedite or slow down reselections for UEs located in the particular geographical area. Additionally or alternatively, the mapping can indicate respective trigger conditions associated with corresponding beams so that when a trigger condition is met, a corresponding beam is deemed eligible (or is deemed ineligible, as the case may be) to be considered as a candidate beam for reselection. For example, Beam A covering geographical area A' may be eligible for reselection only when the Signal to Noise Ratio (SNR) is between a lower limit threshold and an upper limit threshold.

The trigger condition(s) for initiating reselection and/or the trigger condition(s) for candidate beam eligibility for reselection can include one or more thresholds (e.g., Reference Signal Received Power (RSRP) threshold, a Signal to Noise Ratio (SNR) threshold, a Signal to Interference and Noise Ratio (SINR) threshold, etc.). The one or more thresholds can include lower limit or lower bound threshold(s) which, when exceeded, can correspond to a respective candidate beam being eligible for reselection by the UE or can correspond to the UE initiating reselection. The one or more thresholds can include upper limit or upper bound threshold(s) which, when exceeded, correspond to a respective candidate beam no longer being eligible for reselection by the UE. The trigger condition(s) can additionally or alternatively include a respective hysteresis interval, a respective offset, and/or one or more other conditions which, after occurrence or when met, thereby makes the respective candidate beam eligible or ineligible for reselection by the UE. Still additionally or alternatively, the trigger condition(s) can include occurrences of detected, predicted, and/or scheduled events, such as faults, maintenance or diagnostics, scheduled downtime, and the like. In some of these embodiments (not shown), the method 500 can further include adjusting, by the processing hardware of the NTN, a level, a magnitude, or a value of at least one of the one or more trigger conditions. As such, transmitting the indication of the one or more trigger conditions can include transmitting an indication of the adjusted level, magnitude, or value of the at least one of the one or more trigger conditions, in some scenarios.

Thus, as discussed above, the NTN can utilize multiple different ways to transmit 505 indications of candidate beams to UEs. For example, the NTN can broadcast, via SIBs transmitted by multiple NTN base stations, respective mappings of candidate beams associated with the beam via which the SIB is being transmitted. Additionally or alternatively, upon a UE detecting the presence of the NTN (e.g., by detecting transmissions broadcast by one or more NTN base stations of the NTN system) and initiating a camping-on to an NTN base station, the NTN can transmit a mapping of candidate beams associated with the beam via which the UE camps-on to the NTN base station. Still additionally or alternatively, the NTN can transmit an indication of a candidate beam for the UE in conjunction with a Release or Suspend message, where the candidate beam may or may not override the candidate beam(s) indicated by the mapping for the UE's geographical location. Further, the NTN can transmit updates to mappings (e.g., candidate beams, threshold conditions, priorities, etc.) at any time while the UE is associated with the NTN system, e.g., via SIBs, PDCCHs, etc. In this manner, as the NTN base stations move non-terrestrially, the NTN can update the tracking-assistance mapping utilized by the UE for beam reselection.

Figure 6:
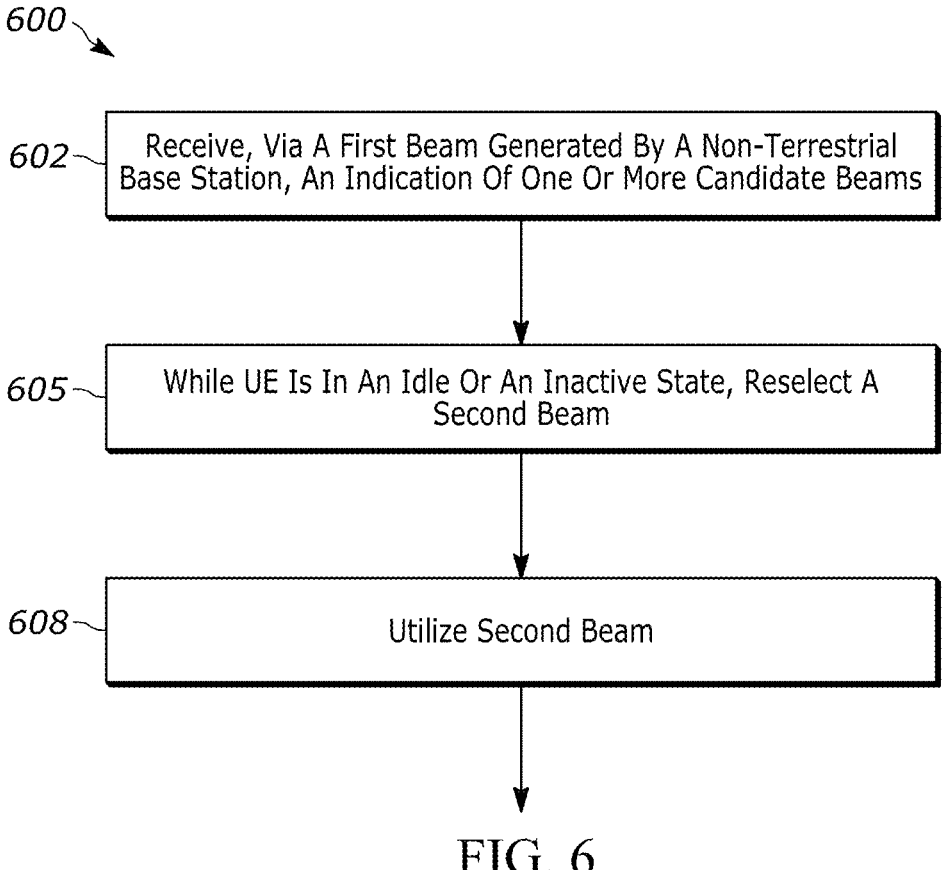
FIG. 6 depicts a flow diagram of an example method in a User Equipment (UE) of performing beam tracking for reselection.

As discussed above, the UE can utilize indications of candidate beams (e.g., either indications of individual beams and/or mappings of candidate beams) received from one or more NTN base stations to perform reselection. To illustrate, FIG. 6 depicts a flow diagram of an example method 600 in a User Equipment (UE). The UE can be, for example, the UE 110 of FIG. 1, the UE 305 of FIG. 3, or one of UE1-UE6 of FIG. 4. The description of the method 600 below simultaneously references FIGS. 1-4 for clarity of illustration (and not limitation) purposes. Further, in some embodiments, at least portions of the method 600 can execute in conjunction with at least portions of one or more other methods described within this document, such as the method 500. Still further, in some embodiments, the method 600 includes one or more alternate and/or additional actions other than those shown in FIG. 6.

At a block 602, the method 600 includes receiving, by processing hardware of the UE, an indication of a set of candidate beams for reselection by the UE. The indication of the set of candidate beams can be received at the UE via a first beam generated by a first non-terrestrial base station of a non-terrestrial network (NTN), for example, via a PDCCH of the first NTN base station (e.g., in the DCI or other suitable fields of information transmitted via the PDCCH from the first NTN base station) and/or via a SIB, for instance. In some scenarios, the indication of the set of candidate beams can be received at the UE via the first beam in conjunction with an instruction to release or suspend an established connection, e.g., in a Release or a Suspend message of the protocol for controlling radio resources, or in an associated message. The UE can receive 602 the indication of the set of candidate beams while the UE is in any state of a protocol for controlling radio resources (e.g., an RRC protocol or other suitable protocol).

The set of candidate beams can include only a single candidate beam or can include multiple candidate beams, each of which is generated by a respective NTN base station. In some situations, at least one of the candidate beams can be another beam generated by the first NTN base station, and in some situations, one or more candidate beams of the set can be generated by one or more other base NTN stations. Each indication of a candidate beam can be of any suitable format, such as an explicit beam identification, a B-RNTI or other indirect or referential identifier such as indications of respective RACH resources, bit map, index, etc., or any other format such as described above. For example, in some situations, receiving 602 the indication of the set of candidate beams can include receiving an indication of a B-RNTI, and the UE can utilize the indicated B-RNTI to descramble at least a portion of a transmission that is received from the first NTN base station and in which explicit beam identification(s) are included, thereby obtaining the explicit beam identification(s) of the set of candidate beams.

In some embodiments (not shown), the method 600 includes receiving an indication of other information respectively corresponding to one or more candidate beams. For example, the other information can include respective priorities of at least one candidate beam, e.g., with respect to priorities of other candidate beams. The other information can include an indication of a respective set of RACH resources (e.g., a time slot, a frequency-resource block, a sequence for PRACH, etc.) for at least one candidate beam, an indication of one or more respective trigger conditions for one or more candidate beams, where the trigger conditions can include upper and/or lower threshold limits, hysteresis intervals, offsets, occurrences of events, etc., such as those described elsewhere in this document.

In some embodiments, receiving 602 the indication of the set of candidate beams includes the UE receiving, e.g., via the PDDCH and/or via a SIB, a mapping which indicates one or more candidate beams for different terrestrial, geographic areas or locations, in some cases, with respective associated times of availability of the candidate beams for coverage that the respective geographical areas. The mapping can explicitly and/or indirectly indicate each candidate beam, such as in manners described above. In some scenarios, the mapping further includes respective other information for at least one candidate beam, such as a relative priority (e.g., with respect to other candidate beams), RACH resources, one or more trigger conditions, etc., such as in manners described elsewhere in this document. The UE can locally store the received mapping, and can subsequently utilize the contents of the mapping to perform beam reselection, e.g., without needing to receive in-line tracking assistance information from the NTN. Further, the NTN can send updates of the mapping to the UE (and, optionally, an indication of whether the updates are permanent or temporary), and the UE can update its stored mapping accordingly.

At a block 605, the method 600 includes, while the UE is not in a Connected state of a protocol for controlling radio resources, reselecting, by the processing hardware of the UE, a second beam based on the received indication. For example, at the block 605, the UE can be in an Idle, Inactive, or some other non-connected state. For instance, the UE can be in an Idle state 315 such as when the UE initially boots up and is camped-on to the first NTN base station, the UE can be in a post-connected Idle state 318 (e.g., based on a Release message received from the first NTN base station), the UE can be in a post-connected Inactive state 318 (e.g., based on a Release with Suspend or Suspend message received from the first NTN base station), etc.

The UE may have previously received and stored the indication of the set of one or more candidate beams, e.g., when the indication is included in a message or mapping which was previously received at the UE from the NTN and locally stored at the UE. As such, the UE can reselect 605 the second beam based on the contents of the stored message or mapping. In some scenarios, the UE can receive and store the indication of the set of one or more candidate beams in-line with entering into the non-connected state, e.g., in conjunction with a Release or Suspend message. In these scenarios, the indication of the candidate beam(s) can be an update or an override to the locally stored mapping or candidate beam information. When the indication is an update, the UE can update the locally store mapping or candidate beam information with any indicated changes, and when the indication is an override, the UE can use the received information for the present reselection, and then revert back to the stored mapping for subsequent reselections.

In some situations, the UE can reselect 605 the second beam from among the indicated candidate beams, e.g., based on the current geographic location of the UE, priorities, thresholds, and/or the occurrences of other trigger condition(s). That is, the reselected beam can be one of the indicated candidate beams. In some situations, though, the UE reselects 605 the second beam based on the received indication of the set of one or more candidate beams; however, the reselected beam may not one of the candidate beams indicated by the NTN. For example, the first NTN base station can send an indication of only one candidate beam for reselection, the UE determines that the UE is not able to detect or otherwise camp on to the indicated candidate beam based on factors occurring at and/or detected by the UE (for example, in situations in which the NTN does not detect any interference or quality degradation of the candidate beam, but the UE does), and the UE reselects a beam other than the indicated beam which, to the UE, is more suitable. Additionally, in some situations, the UE can reselect 605 the second beam further based on the current and/or a predicted geographical location of the UE, a current and/or predicted speed of travel of the UE, a current and/or predicted geographical direction of the UE, data and/or measurements which have been collected and/or determined by the UE, and the like. As such, reselecting 605 the second beam can be based not exclusively on the set of candidate beams indicated by the first NTN base station, but also based on various conditions and aspects which are detected or determined by the UE (e.g., quality of service as perceived by the UE, UE movement and behavior, etc.).

Of course, candidate beams for reselection can differ based on the UE's geographical location, and candidate beams for reselection can be different than candidate beams for handover. For example, a UE can be in a Connected state at a first geographical location, and a locally stored mapping at the UE indicates a first set of candidate beams for the UE which are eligible for reselection by the UE at the first geographical location. While in the Connected state, the UE moves from the first geographical location to a second geographical location, and hands over its connection with the NTN from a first servicing beam to a second servicing beam, e.g., by using a known handover technique. The locally stored mapping indicates a second set of candidate beams for the UE which are eligible for reselection while the UE is located in the second geographical location. Accordingly, upon exiting the Connected state and entering into a non-Connected state, the UE can reselect a subsequent beam based on the second set of candidate beams (and optionally based on any updates thereto, if received from the NTN in-line with the state transition and/or based on other factors detected at the UE, such as described above).

At a block 608, the method 600 includes the UE utilizing the reselected beam. For example, the UE can register or camp on to the reselected beam. In scenarios in which the UE received an indication of RACH resources for the reselected beam, the UE can utilize the RACH resources to register, camp on to, track, or otherwise maintain contact and/or communicate with NTN via the reselected beam.

To illustrate using an example scenario, and referring again to FIG. 4, at time T1, SAT1:B1 can transmit indications of candidate beams for time T2 as follows:

Candidate 1: explicit beam identifier (e.g., radio access resources for the beam, such as channel, timing, etc.) for SAT2:B2 corresponding to geographical location 405, where the explicit beam identifier is scrambled by the referential beam identifier of SAT2:B2 (e.g., is scrambled using B-RNTI2); and Candidate 2: explicit beam identifier for SAT3:B3 corresponding to geographical location 408, where the explicit beam identifier for SAT3:B3 is scrambled by the referential beam identifier of SAT3:B3 (e.g., is scrambled using B-RNTI3).

For example, at time T1, SAT1:B1 can broadcast both candidate beam indications (e.g., Candidate 1 and Candidate 2, and optionally indications of respective geographical locations of Candidate 1 and Candidate 2) to all UEs located within geographical area 402, and/or SAT:B2 can transmit the indication of Candidate 1 to only UEs that are located in geographical area 405 at time T1 and transmit the indication of Candidate 2 to only UEs that are located in geographical area 408 at time T1. In some implementations, SAT1: B1 can broadcast and/or transmit an indication of the relative priorities between Candidate 1 and Candidate 2, where the relative priorities may be utilized by UEs which are located on the borders of areas 405 and 408 (e.g., UE 3 and UE4) to perform reselection, and/or by any other UEs for reasons (for example, when a specific UE is unable to demodulate to system information of a specific NTN base station or some other fault condition). Each UE UE1-UE6 can store and/or update a locally-stored mapping of reselection candidates (and optionally other related information such as relative priorities, radio access resource information, etc.) in accordance with the received candidate beam indication(s).

As such, at time T2 when SAT2 and SAT3 have moved to cover their respective geographical areas 405, 408, each UE UE1-UE6 can utilize its respective B-RNTI and stored mapping to obtain channel and timing parameters to utilize in attempting to demodulate respective NTN base station system information. UEs located on the border between geographical locations 405 and 408, can attempt to demodulate respective NTN base station system information in priority order which was previously indicated by the system 100. For example, if the system 100 had previously indicated that candidate beam SAT2:B2 has a higher priority than candidate beam SAT3:B3, UE3 can first utilize B-RNTI2 to obtain, from the stored mapping, channel and timing parameters for demodulating the NTN-BS2 system information beam and, if unsuccessful, UE3 can then utilize B-RNTI3 to obtain, from the stored mapping, channel and timing parameters for demodulating the NTN-BS3 system information beam.

Further, and advantageously, the techniques for system assisted beam tracking can be utilized in conjunction with (and in some situations, can improve) techniques for generalized cell reselection. For example, as described above, a UE can utilize stored candidate beam mapping information to more quickly (e.g., as compared to known techniques) obtain system parameters to use in cell reselection, e.g., without having to process a Master Information Block of a reselected cell. Additionally or alternatively, the system 100 can transmit candidate beam identities and associated information (e.g., such as described above) along with cell reselection information in System Information Blocks so that the UEs can receive and locally store candidate reselection beam identifiers and associated information for future use when performing cell reselection.

Accordingly, as demonstrated above, the methods and techniques disclosed within this document provide significant advantages over known techniques for UEs tracking beams generated by non-terrestrial base stations which move through air or space. In particular, tracking beams for reselection is no longer solely under the purview of the UE as the NTN provides the UE with beam tracking assistance. Importantly, the NTN can provide the UE with a mapping of candidate beams for reselection at various physical geographical locations (and at various times), which corresponds to the movement of the NTN base stations. The UE can store the mapping locally and utilize the mapping during reselection, thus decreasing the amount of messaging and UE resources needed to determine candidate beams over known techniques of beam tracking which require a UE to make multiple measurements prior to each reselection. Further, the NTN can update or override the mapping based on various conditions that are detected, planned, expected, predicted, or observed by the NTN and not detectable by or otherwise known to the UE on its own. As such, using the disclosed techniques, beam failure during reselection can occur less often as compared with currently implemented reselection techniques, thereby still further decreasing the amount of messaging and UE resources which are used to track and reselect beams, as well as providing better quality of service.

The following additional considerations apply to the foregoing discussion.

A user device or User Equipment (UE) in which the techniques of this disclosure can be implemented (e.g., the UE 110) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc.

The software can be executed by one or more general-purpose processors or one or more special-purpose processors.

Upon reading this disclosure, those of skill in the art will appreciate still additional alternative structural and functional designs for enhancing the handling of user equipment in a radio resource control inactive state through the principles disclosed in this disclosure. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

EXAMPLES

Example 1. A method in a user equipment device (UE), the method comprising:

receiving, by processing hardware of the UE via a first beam generated by a first non-terrestrial base station of a non-terrestrial network (NTN), an indication of a set of candidate beams for the UE to use to communicate with the NTN;

while the UE is not in a connected state of a protocol for controlling radio resources, reselecting, by the processing hardware of the UE, a second beam based on the received indication, the second beam generated by the first non-terrestrial base station or by a second non-terrestrial base station of the NTN; and utilizing, by the processing hardware of the UE, the reselected beam.

Example 2. The method of Example 1, wherein receiving the indication of the set of candidate beams includes receiving an indication of the set of candidate beams in conjunction with receiving an instruction to release from the first non-terrestrial base station.

Example 3. The method of Example 1, wherein receiving the indication of the set of candidate beams includes receiving the indication of the set of candidate beams via a Physical Downlink Control Channel (PDCCH) of the first non-terrestrial base station.

Example 4. The method of the preceding Examples, wherein receiving the indication of the set of candidate beams via the PDDCH includes receiving downlink control information (DCI), the DCI including a respective identifier of at least one candidate beam included in the set of candidate beams.

Example 5. The method of any one of Examples 3-4, wherein receiving the indication of the set of candidate beams via the PDCCH includes receiving, via the PDCCH, information which has been scrambled by using a respective identifier of at least one candidate beam included in the set of candidate beams.

Example 6. The method of any one of Examples 1 and 3-5, wherein receiving the indication of the set of candidate beams includes receiving the indication of the set of candidate beams via a System Information Block (SIB) transmitted by the first non-terrestrial base station.

Example 7. The method of the preceding Example, wherein receiving the indication of the set of candidate beams includes receiving the indication of the set of candidate beams via the SIB while the UE is in an inactive state or an idle state of the protocol.

Example 8. The method of any one of Examples 6-7, wherein receiving the indication of the set of candidate beams via the SIB includes receiving a respective identifier of each different candidate beam via the SIB.

Example 9. The method of any one of the preceding Examples, wherein:

receiving the indication of the set of candidate beams includes receiving an indication of one or more trigger conditions corresponding to the set of candidate beams for the UE to initiate reselection, the one or more trigger conditions including at least one of: a Reference Signal Received Power (RSRP) threshold, a Signal to Noise Ratio (SNR) threshold, a Signal to Interference and Noise Ratio (SINR) threshold, a hysteresis interval, or an offset; and reselecting the second beam includes reselecting the second beam based on an occurrence of at least one of the one or more trigger conditions.

Example 10. The method of the preceding Example, wherein:

receiving the indication of the one or more trigger conditions includes receiving an indication of one or more thresholds, the one or more thresholds including at least one of an upper limit threshold or a lower limit threshold; and reselecting the second beam based on the occurrence of the at least one of the one or more trigger conditions includes reselecting the second beam based on an occurrence of exceeding at least one of the one or more thresholds.

Example 11. The method of any one of Examples 9-10, wherein receiving the indication of the one or more trigger conditions corresponding to the set includes receiving an indication of a respective set of trigger conditions for each different candidate beam included in the set.

Example 12. The method of any one of Examples 9-11, wherein each respective set of trigger conditions corresponds to a respective geographical area, and reselecting the second beam based on the occurrence of the at least one of the respective set of trigger conditions for the second beam includes:

reselecting the second beam based on a geographic location of the UE.

Example 13. The method of any one of the preceding Examples, wherein:

receiving the indication of the set of candidate beams includes receiving an indication of a respective beam priority for each beam included in the set; and reselecting the second beam includes reselecting the second beam further based on the respective beam priorities.

Example 14. The method of the preceding Example, wherein each respective beam priority corresponds to a respective geographical area, and reselecting the second beam based on the respective priorities includes reselecting the second beam based on a geographic location of the UE.

Example 15. The method of any one of the preceding Examples, wherein:

receiving the indication of the set of candidate beams includes receiving an indication of a respective set of Random Access Channel (RACH) resources for at least one candidate beam included in the set, the at least one candidate beam including the second beam; and the method further comprises utilizing, by the processing hardware of the UE, the respective set of RACH resources of the second beam to communicate with the second non-terrestrial base station.

Example 16. The method of the preceding Example, wherein the respective set of RACH resources includes at least one of: a time slot, a frequency-resource block, or a sequence for a Physical Random Access Channel (PRACH).

Example 17. The method of any one of the preceding Examples, wherein receiving the indication of the set of candidate beams includes receiving an indication of only a single candidate beam.

Example 18. The method of any one of Examples 1-16, wherein:

receiving the indication of the set of candidate beams includes receiving an indication of a plurality of candidate beams; and reselecting the second beam includes selecting the second beam from among the plurality of candidate beams.

Example 19. The method of the preceding Example, wherein:

receiving the indication of the plurality of candidate beams includes receiving an indication of a mapping of different candidate beams to different geographical areas; and reselecting the second beam includes reselecting the second beam based on the mapping and a geographical location of the UE.

Example 20. The method of the preceding Example, wherein:

the mapping received from the first non-terrestrial base station is a first mapping; and reselecting the second beam includes reselecting the second beam based on the first mapping, the geographical location of the UE, and a second mapping of a plurality of beams to respective geographical areas, the plurality of beams generated by non-terrestrial base stations of the NTN, and the second mapping stored in a memory of the UE.

Example 21. The method of any one of Examples 19-20, wherein the geographical location of the UE is a first geographical location, and the method further comprises:

while the UE is in an active or connected state of the protocol, handing-over, by the processing hardware of the UE and based on the mapping and a second geographical location of the UE, a connection of the UE with the NTN to a third beam generated by a respective non-terrestrial base station of the NTN.

Example 22. The method of the preceding Example, wherein handing-over the connection to the third beam is further based on at least one of: a current speed, a current geographical direction of the UE, or a non-terrestrial location of the respective non-terrestrial base station generating the third beam.

Example 23. The method of any one of the preceding Examples, further comprising receiving a respective Beam-Radio Network Temporary Identifier (B-RNTI) of at least one candidate beam in conjunction with receiving the indication of the set of candidate beams.

Example 24. The method of the preceding Example, further comprising descrambling the indication of the set of candidate beams using the respective B-RNTI.

Example 25. The method of any one of Examples 1-24, wherein the first non-terrestrial base station generates the second beam.

Example 26. The method of any one of Examples 1-24, wherein the second non-terrestrial base station generates the second beam.

Example 27. The method of any one of Examples 1-26, wherein the first non-terrestrial base station and the second non-terrestrial base station are satellites.

Example 28. The method of any one of Examples 1-26, wherein the first non-terrestrial base station and the second non-terrestrial base station are high altitude platform (HAP) stations.

Example 29. The method of any one of the preceding Examples, wherein reselecting the second beam is further based on at least one of a speed or a geographical direction of the UE.

Example 30. The method of any one of Examples 1-29, wherein the UE reselects the second beam while the UE is in an inactive state of the protocol.

Example 31. The method of Example 1-29, wherein the UE reselects the second beam while the UE is in an idle state of the protocol.

Example 32. A User Equipment (UE) configured to perform the method of any one of Examples 1-31.

Example 33. A method in a non-terrestrial network (NTN), the method comprising:

determining, by processing hardware of the NTN, a candidate beam for a set of User Equipment devices (UEs) to use to communicate with the NTN, the candidate beam generated by a non-terrestrial base station of the NTN, and the determining based on a non-terrestrial location of the non-terrestrial base station and a geographical area of the set of UEs; and transmitting, by processing hardware of the NTN, an indication of the candidate beam to the set of UEs.

Example 34. The method of Example 33, wherein transmitting the indication of the candidate beam to the set of UEs includes transmitting, to a particular UE included in the set of UEs, the indication of the candidate beam in conjunction with an instruction to release an existing connection.

Example 35. The method of any one of Examples 33-34, wherein transmitting, by the processing hardware of the NTN, the indication of the candidate beam includes transmitting the indication of the candidate beam via a Physical Downlink Control Channel (PDCCH).

Example 36. The method of Example 35, wherein transmitting the indication of the candidate beam via the PDCCH includes transmitting downlink control information (DCI) via the PDCCH, the DCI including an identifier of the candidate beam.

Example 37. The method of any one of Examples 35-36, wherein transmitting the indication of the candidate beam via the PDCCH includes scrambling, by using an identifier of the candidate beam, at least a portion of information transmitted via the PDCCH.

Example 38. The method of any one of Examples 33-37, wherein transmitting the indication of the candidate beam for the set of UEs includes transmitting the indication of the candidate beam in a System Information Block (SIB).

Example 39. The method of any one of Examples 33-38, wherein the set of UEs includes only one UE.

Example 40. The method of any one of Examples 33-39, wherein the set of UEs includes multiple UEs.

Example 41. The method of any one of Examples 33-40, wherein transmitting the indication of the candidate beam to the set of UEs includes transmitting the indication of the candidate beam to at least one UE which is in an inactive state or an idle state of a protocol for controlling radio resources.

Example 42. The method of any one of Examples 33-41, further comprising transmitting, to the set of UEs, an indication of one or more trigger conditions for the set of UEs to initiate reselection, the one or more trigger conditions including at least one of a Reference Signal Received Power (RSRP) threshold, a Signal to Noise Ratio (SNR) threshold, a Signal to Interference and Noise Ratio (SINR) threshold, a hysteresis interval, or an offset.

Example 43. The method of the preceding Example, further comprising adjusting, by the processing hardware of the NTN, a level, a magnitude, or a value of at least one of the one or more trigger conditions, and wherein transmitting the indication of the one or more trigger conditions includes transmitting an indication of the adjusted level, magnitude, or value of the at least one of the one or more trigger conditions.

Example 44. The method of any one of Examples 33-43, wherein transmitting the indication of the candidate beam includes transmitting an indication of a mapping of different candidate beams to different geographical areas, and at least one geographical area of the different geographical areas corresponds to the geographical area of the set of UEs.

Example 45. The method of Example 44, wherein the mapping indicates a respective identifier of each different candidate beam.

Example 46. The method of any one of Examples 44-45, wherein the mapping indicates a respective set of Random Access Channel (RACH) resources for each different candidate beam.

Example 47. The method of the preceding Example, wherein the respective set of RACH resources includes at least one of: a time slot, a frequency-resource block, or a sequence for a Physical Random Access Channel (PRACH).

Example 48. The method of any one of Examples 44-47, further comprising transmitting, to the set of UEs, an indication of a respective beam priority corresponding to each different geographical area.

Example 49. The method of any one of Examples 44-48, further comprising transmitting, to the set of UEs, an indication of a respective trigger condition corresponding to each different geographical area.

Example 50. The method of the preceding Example, wherein the respective trigger condition includes at least one of a Reference Signal Received Power (RSRP) threshold, a Signal to Noise Ratio (SNR) threshold, a Signal to Interference and Noise Ratio (SINR) threshold, a hysteresis interval, or an offset.

Example 51. The method of any one of Examples 33-50, wherein determining, by the processing hardware of the NTN, the candidate beam for the set of UEs includes determining, by processing hardware of a ground station of the NTN, the candidate beam for the set of UEs.

Example 52. The method of any one of Examples 33-51, wherein determining, by the processing hardware of the NTN, the candidate beam for the set of UEs includes determining, by processing hardware of one or more non-terrestrial base stations of the NTN, the candidate beam for the set of UEs.

Example 53. The method of the preceding Example, wherein the one or more non-terrestrial base stations excludes the non-terrestrial base station generating the candidate beam.

Example 54. The method of any one of Examples 33-53, wherein determining the candidate beam for the set of UEs based on the geographical area of the set of UEs includes determining the candidate beam for the set of UEs based on a geographical area corresponding to respective current geographical locations of the set of UEs.

Example 55. The method of any one of Examples 33-54, wherein determining the candidate beam for the set of UEs based on the geographical area of the set of UEs includes determining the candidate beam for the set of UEs based on a geographical area corresponding to respective predicted geographical locations of the set of UEs.

Example 56. The method of the preceding Example, further comprising predicting, by the processing hardware of the NTN, a respective predicted geographical location of at least one UE included in the set of UEs.

Example 57. The method of any one of Examples 33-56, wherein determining the candidate beam based on the non-terrestrial location of the non-terrestrial base station includes determining the candidate beam based on a current non-terrestrial location of the non-terrestrial base station.

Example 58. The method of any one of Examples 33-57, wherein:

determining the candidate beam based on the non-terrestrial location of the non-terrestrial base station includes determining the candidate beam based on a predicted non-terrestrial location of the non-terrestrial base station; and the method further comprises determining, by the processing hardware of the NTN, the predicted non-terrestrial location of the non-terrestrial base station.

Example 59. The method of any one of Examples 33-58, wherein determining the candidate beam is further based on at least one of a current or a predicted non-terrestrial location of another non-terrestrial base station.

Example 60. The method of the preceding Example, further comprising determining, by the processing hardware of the NTN, the predicted non-terrestrial location of the another non-terrestrial base station.

Example 61. The method of any one of Examples 33-60, wherein the non-terrestrial base station generating the candidate beam transmits the indication of the candidate beam.

Example 62. The method of any one of Examples 33-61, wherein a non-terrestrial base station other than the non-terrestrial base station generating the candidate beam transmits the indication of the candidate beam.

Example 63. The method of any one of Examples 33-62, wherein the non-terrestrial base station is a satellite.

Example 64. The method of any one of Examples 33-62, wherein the non-terrestrial base station is a high altitude platform (HAP) station.

Example 65. The method of any one of Examples 33-64, further comprising transmitting, by processing hardware of the NTN, a Beam-Radio Network Temporary Identifier (B-RNTI) of the candidate beam in conjunction with transmitting the indication of the candidate beam.

Example 66. The method of the preceding Example, further comprising scrambling the indication of the candidate beam by using the B-RNTI, and wherein transmitting the indication of the candidate beam includes transmitting the scrambled indication of the candidate beam.

Example 67. The method of any one of Examples 33-66, wherein the indication of the candidate beam includes an indication of a set of Random Access Channel (RACH) resources of the candidate beam, the set of RACH resources including at least one of: a time slot, a frequency-resource block, or a sequence for a Physical Random Access Channel (PRACH).

Example 68. A non-terrestrial base station configured to perform the method of any one of Examples 33-67.

Example 69. Any one of the preceding Examples in combination with any other one of the preceding Examples.

What is claimed is:

1. A method performed by a user equipment device, UE, the method comprising:

receiving, via a first beam generated by a first non-terrestrial base station of a non-terrestrial network, NTN, an indication of a set of candidate beams for the UE usable to communicate with the NTN;

descrambling the indication of the set of candidate beams using a Beam-Radio Network Temporary Identifier, B-RNTI, corresponding to the first beam;

reselecting a second beam from the set of candidate beams, the second beam being generated by the first non-terrestrial base station or by a second non-terrestrial base station of the NTN; and utilizing the second beam to communicate via the NTN.

2. The method of claim 1, wherein the receiving of the indication of the set of candidate beams includes receiving an instruction to release a connection with the first non-terrestrial base station using the first beam.

3. The method of claim 1, wherein:

the receiving of the indication of the set of candidate beams includes receiving information on a respective beam priority for each of plural candidate beams included in the set; and the reselecting of the second beam is based on beam priorities of the plural candidate beams.

4. The method of claim 1, wherein:

the receiving of the indication of the set of candidate beams includes receiving a respective set of Random Access Channel, RACH, resources for at least one of the candidate beams included in the set, wherein the at least one of the candidate beams is the second beam; and the UE utilizes the respective set of RACH resources of the second beam to communicate with the second non-terrestrial base station.

5. The method of claim 4, wherein the respective set of RACH resources includes at least one of: a time slot, a frequency-resource block, or a sequence for a Physical Random Access Channel, PRACH.

6. The method of claim 1, wherein the indication of the set of candidate beams includes a respective Beam-Radio Network Temporary Identifier, B-RNTI, of at least one of the candidate beams.

7. The method of claim 1, wherein the indication of the candidate beam includes a mapping of a plurality of candidate beams in the set of candidate beams to the geographical area.

8. The method of claim 1, wherein the first beam corresponds to a Physical Downlink Control Channel, PDCCH.

9. The method of claim 1, wherein the receiving of the indication includes receiving a downlink control information, DCI, message.

10. The method of claim 1, wherein the receiving of the indication includes receiving a system information block, SIB.

11. A wireless communication device including a wireless communication interface and a processor connected to the wireless communication interface configured to perform the method of claim 1.

12. A method in a non-terrestrial network, NTN, the method comprising:

determining a candidate beam usable by at least one User Equipment, UE, to communicate with the NTN via a non-terrestrial base station thereof, the determining being based on a location of the non-terrestrial base station and a geographical area in which the at least one UE is located; and transmitting, using a first beam, an indication of the candidate beam to the at least one UE, the indication being scrambled using a Beam-Radio Network Temporary Identifier, B-RNTI, corresponding to the first beam.

13. The method of claim 12, wherein the at least one UE is one of a set of UEs located in the geographical area, and the transmitting of the indication of the candidate beam to the at least one UE includes transmitting, to the at least one UE, the indication of the candidate beam in conjunction with an instruction to release an existing connection.

14. The method of claim 12, wherein the transmitting of the indication of the candidate beam includes mapping of each one of a plurality of candidate beams to the geographical area.

15. The method of claim 12, wherein the transmitting of the indication of the candidate beam indicating a respective set of Random Access Channel, RACH, resources for each of at least one of the candidate beams.

16. The method of claim 15, wherein the respective set of RACH resources includes at least one of: a time slot, a frequency-resource block, or a sequence for a Physical Random Access Channel, PRACH.

17. The method of claim 12, wherein the indication of the candidate beams comprises a respective beam priority corresponding to each of the candidate beams.

18. The method of claim 12, further comprising:

adjusting, by the NTN, a level, a magnitude, or a value of at least one of the one or more trigger conditions; and transmitting an indication of the adjusted level, magnitude, or value of the at least one of the one or more trigger conditions.

19. The method of claim 12, wherein the first beam corresponds to a Physical Downlink Control Channel, PDCCH.

20. The method of claim 12, wherein the receiving of the indication includes receiving of a downlink control information, DCI, message or a system information block, SIB.

* * * * *